United States Patent
Chiu et al.

(10) Patent No.: US 11,521,270 B2
(45) Date of Patent: Dec. 6, 2022

(54) SYSTEM AND METHOD FOR MACHINE LEARNING ARCHITECTURE FOR DYNAMIC MARKET STRESS PLATFORM

(71) Applicant: ROYAL BANK OF CANADA, Toronto (CA)

(72) Inventors: Vincent Lok Man Chiu, Toronto (CA); Sahejpreet Kaur Johal, Toronto (CA); Roman Nikolas Heit, Toronto (CA); Asic Qian Chen, Toronto (CA); Jan Valentine Varsava, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 16/994,312

(22) Filed: Aug. 14, 2020

(65) Prior Publication Data
US 2021/0049699 A1 Feb. 18, 2021

Related U.S. Application Data

(60) Provisional application No. 62/886,556, filed on Aug. 14, 2019.

(51) Int. Cl.
| | |
|---|---|
| *G06Q 40/06* | (2012.01) |
| *G06Q 40/08* | (2012.01) |
| *G06N 20/00* | (2019.01) |
| *G06F 3/04847* | (2022.01) |
| *G06N 5/04* | (2006.01) |

(52) U.S. Cl.
CPC ......... *G06Q 40/06* (2013.01); *G06F 3/04847* (2013.01); *G06N 5/04* (2013.01); *G06N 20/00* (2019.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 10,453,142 | B2 * | 10/2019 | Mun | G06Q 40/08 |
| 10,922,755 | B2 * | 2/2021 | Maruyama | G06Q 40/06 |
| 2011/0264602 | A1 * | 10/2011 | Erdman | G06Q 40/06 |
| | | | | 705/36 R |
| 2015/0134566 | A1 * | 5/2015 | Chen | G06Q 40/02 |
| | | | | 705/36 R |
| 2019/0139144 | A1 * | 5/2019 | Mishra | G06N 5/04 |
| 2019/0197206 | A1 * | 6/2019 | Dembo | G06N 5/025 |

* cited by examiner

*Primary Examiner* — Narayanswamy Subramanian
(74) *Attorney, Agent, or Firm* — Norton Rose Fulbright Canada LLP

(57) ABSTRACT

Systems and methods for responsive stress testing that involve back-end machine learning models that produce enterprise market risk calculations and a front-end interface with graphical elements to visually interact with the machine learning models. The interface can load a particular model, specify ranges of each market variables (shock), and investigate how the market variables impact a portfolio based on the rendered graphical elements.

18 Claims, 19 Drawing Sheets

| RBFG | | | | | | | | |
|---|---|---|---|---|---|---|---|---|
| Date | 24 Jul 2020 | | 23 Jul 2020 | | 22 Jul 2020 | | 21 Jul 2020 | |
| Analytic | 6602-Equity Stress W... | | 6602-Equity Stress W... | | 6602-Equity Stress W... | | 6602-Equity Stress W... | |
| VaR Translation Currency | DEFAULT | | DEFAULT | | DEFAULT | | DEFAULT | |
| Book Filter | All in Risk Reporting | Column Name 1 ✱ | All in Risk Reporting | Column Name 1 ✱ | All in Risk Reporting | Column Name 1 ✱ | All in Risk Reporting | Column Name 1 ✱ |
| Node Name ↓ | | | | | | | | |
| ∨ RBFG | (1,149,038,584.45) | | (1,138,240,201.60) | | (1,149,715,546.74) | | (1,148,292,438.86) | |
| > 80394_CORPORATE SUPPORT | (1,058,297,968.43) | | (1,058,297,968.43) | | (1,058,297,968.43) | | (1,058,297,968.43) | |
| > Capital Markets | (26,668,499.37) | | (15,859,277.05) | | (27,509,191.19) | | (25,830,687.12) | |
| > Investor & Treasury Services Con... | - | | - | | - | | - | |
| > Personal & Commercial Banking | (3,860,894.62) | | (3,860,894.62) | | (3,860,894.62) | | (3,860,894.62) | |
| > Wealth Management | (60,211,222.04) | | (60,222,061.51) | | (60,047,492.51) | | (60,302,888.69) | |
| CAD_FX_Translation | - | | - | | - | | - | |
| FX_Skew_RBC | - | | - | | - | | - | |
| FX_Translation_Vector | - | | - | | - | | - | |
| RBC_FFR_Basis_ADDON | - | | - | | - | | - | |
| RBC_IRVolSkew_ADDON | - | | - | | - | | - | |
| RBC_TSYFUT_Basis_ADDON | - | | - | | - | | - | |

Range
Date Range
21 Jul 2020 - 25 Jul 2020
Effective Date
21 Jul 2020
Hierarchy
RBFG
Selected Node
RBFG
Select Analytics
6602-Equity Stress Worst Case
VaR Translation Currency
DEFAULT
Book Filter
All in Risk Reporting
☐ Hide Nodes and Books with no risk
⟳ REFRESH

SYSTEM AND METHOD FOR MACHINE LEARNING ARCHITECTURE FOR DYNAMIC MARKET STRESS PLATFORM

FIELD

The present disclosure generally relates to the field of machine learning and graphical interfaces.

INTRODUCTION

Embodiments described herein relate to machine learning and improved graphical interfaces for visually displaying and rendering computed data. For example, embodiments described herein relate to improved interfaces with interactive visualizations of models, model performance, and market factors to generate and display visual elements indicating meaningful patterns in large market datasets and model performance. Embodiments described herein relate to improved generation and display of visual elements in near real time using improved computational efficiencies. For example, embodiments described herein relate to dynamic graphical interfaces to enable electronic interactions with visual elements to modify models, model data, and model performance.

SUMMARY

In accordance with an aspect of embodiments described herein, there is provided a system for responsive stress testing comprising: a server having non-transitory computer readable storage medium with executable instructions for causing one or more processors to configure: back-end machine learning models that produce enterprise market risk calculations and a front-end interface with graphical elements to visually interact with the machine learning models.

In some embodiments of the innovation described herein, the server receives metrics generated by production risk engines and market conditions as scenario input risk, and generates a PnL value based on the scenario input risk. The front-end interface has a graphical element that corresponds to the computed PnL value.

In some embodiments of the innovation described herein, the interface can receive a command to load a particular model and input data to specify ranges of market variables as shock, and display graphical elements to visually depict how the market variables impact a portfolio.

In accordance with an aspect of embodiments described herein, there is provided a system for responsive stress testing with a memory storing a plurality of back-end machine learning models that produce enterprise market risk metrics by receiving features extracted from data defining risk factors and market shocks.

The system has a processor executing instructions stored in the memory to configure the back-end machine learning models with the features extracted from data defining risk factors and market shocks and continuously update a front-end interface with interactive visual elements. The interface has graphical elements corresponding to risk factors and market shocks. The interface has a first set of selectable indicia to adjust values for the risk factors and market shocks to provide selected values for the risk factors and market shocks as input to the processor for the data defining risk factors and market shocks.

The interface has graphical elements corresponding to models of the back-end machine learning models.

The interface has a second set of selectable indicia to select the models and adjust scenario data to provided selected scenario data to the processor to generate scenarios.

The interface has graphical elements corresponding to model performance visualizations to visually compare the models with the adjusted values for the risk factors and market shocks over a period of time, wherein the processor generates the model performance data by receiving the adjusted values for the risk factors and market shocks, the models and the adjusted scenario data from the interface over time periods, wherein the model performance data indicate visually how the risk factors and market shocks impact portfolio objects and PnL values for the portfolio objects.

The interface has graphical elements corresponding to selected scenario output generated by the processor using the adjusted scenario data received from the interface to indicate scenario losses over the period of time.

The processor generates output data as a vector of the model performance data and transmits the output data to the front-end interface.

The processor and the interface exchange data and commands to generate interactive visual elements that dynamically update as new models are selected, new risk factors features extracted, and new scenarios are generated.

In some embodiments, the front-end interface with the graphical elements visually identify a set of risk factors corresponding to stress losses.

In some embodiments, the front-end interface with the graphical elements visually identify model performance by depicting accuracy of predicted stress losses.

In some embodiments, the models comprise official end of day valuation models to measure results of model performance and update models by further calibration.

In some embodiments, the back-end machine learning models comprise challenger models.

In some embodiments, the front-end interface with the graphical elements visually identify risk factors or market variables for incremental improvement in the model performance.

In some embodiments, one or more processors receive metrics generated by production risk engines and market conditions as scenario input risk, and generate a PnL value based on the scenario input risk, wherein the front-end interface has a graphical element that corresponds to the computed PnL value.

In some embodiments, the interface can receive a command to load a particular model and input data to specify ranges of market variables as shock, and display graphical elements to visually depict how the market variables impact a portfolio.

In some embodiments, visual elements of the interface have parallel coordinates where different axis representing different risk factors and different colours represent different PnL values.

In some embodiments, the interface receives a selected model and ranges for each of a plurality of market shocks, and provides instructions to the processor to load the selected model and ranges for each of a plurality of market shocks for generating the model performance data.

In some embodiments, the interface has a button to trigger generation of different scenario data structures and output data of values for selected scenarios.

In some embodiments, the interface receives a selection of a different set of models than the models and updates the graphical elements to correspond to the different set of models and updated model performance data for the different set of models, wherein the processor receives the selection of the different set of models to generate the updated model performance data to regenerate the graphical elements of the interface.

In some embodiments, the processor uses stress scenario to test out different machine learning models to assess model performance by generating updated model performance data.

In some embodiments, the interface receives a selected model and updates the graphical elements to show a number of risk factors and calculated PnL values for the selected model.

In some embodiments, the interface comprises different charts that show predicted and actual values for different scenarios side by side.

In some embodiments, the interface detects hovering over a visual element for a scenario with an input device and in response updates to indicate predicted loss calculations for the scenario.

In accordance with an aspect, there is provided a process for responsive stress testing, the process comprising: at a server, generating enterprise market risk metrics using back-end machine learning models, receiving model input data, and updating a front-end interface with graphical elements to visually interact with the machine learning models.

In some embodiments, the process comprises: receiving metrics generated by production risk engines and market conditions as scenario input data, and generating PnL values based on the scenario input risk, wherein the front-end interface has graphical elements that correspond to the computed PnL values.

In some embodiments, the process comprises: receiving a command to load a particular model and input data to specify ranges of market variables as shock, and display graphical elements at the interface to visually depict how the market variables impact a portfolio.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 16 is an example interface of the system for responsive risk testing.

FIG. 18 is an example interface of the system for responsive risk testing.

DETAILED DESCRIPTION

Figure 1:
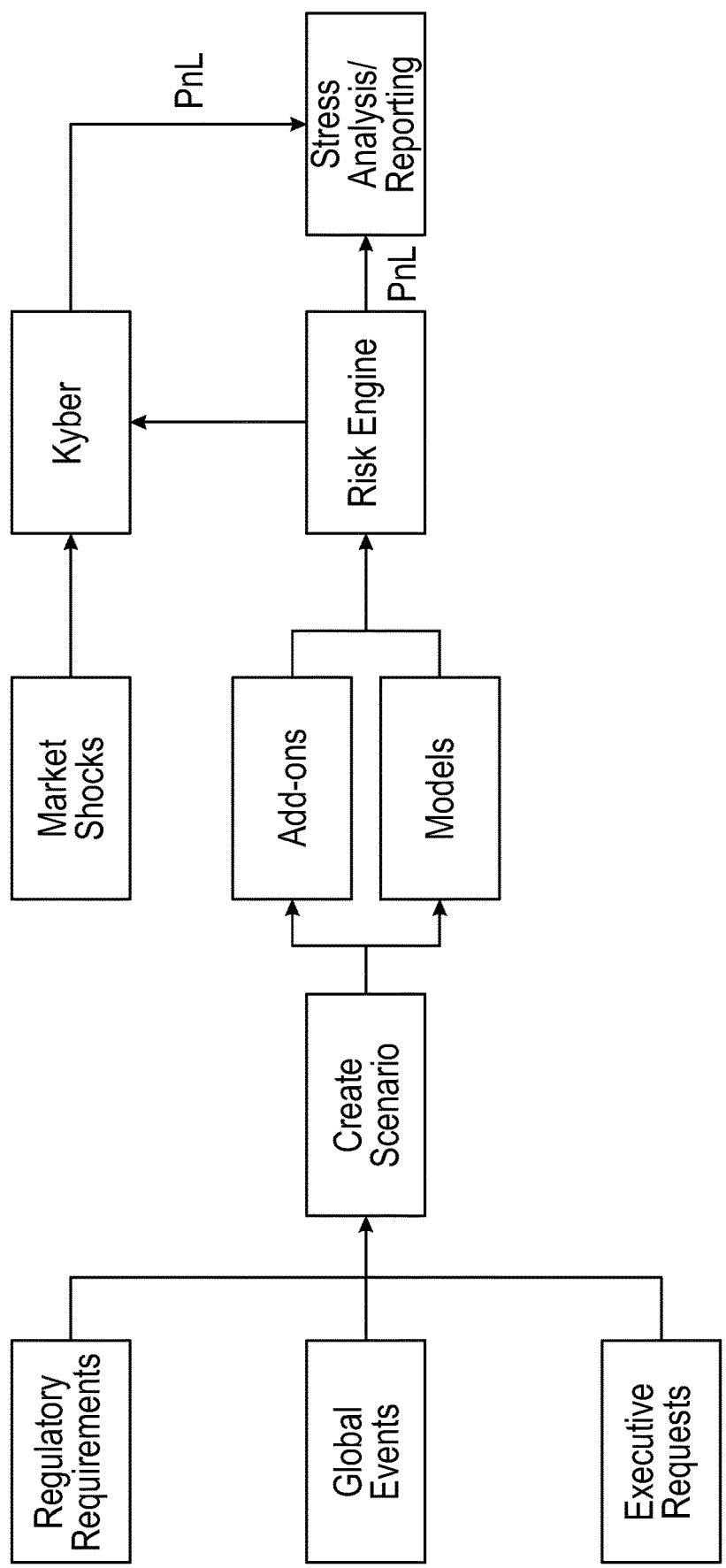
FIG. 1 is a diagram that illustrates an example system for responsive testing.

Embodiments of methods, systems, and apparatus are described with reference to the drawings. Embodiments described herein relate to machine learning and improved graphical interfaces for visually rendering and displaying computed data. For example, embodiments described herein relate to improved interfaces with interactive visualizations of models, model performance, and market factors to generate and display visual elements indicating meaningful patterns in large market datasets and understand model performance. Embodiments described herein relate to improved generation and display of visual elements for the results quickly in near real time using improved computational efficiencies. For example, embodiments described herein relate to dynamic graphical interfaces to enable electronic interactions with visual elements to modify models, model data, and model performance. The interface can be used to impact how results of model performance can be used to update models.

Embodiments described herein relate to machine learning to compute enterprise market risk and improved graphical interfaces for rendering visual elements linked to the computed risk data. In particular, embodiments described herein relate to systems and methods for responsive stress testing that involve back-end machine learning models that produce enterprise market risk calculations and a front-end interface with graphical elements to visually interact with the machine learning models. The interface can load a particular model, specify ranges of each market variables (shock), and investigate how the market variables impact a portfolio based on the rendered graphical elements.

The system updates the model when the ranges for the market variables are received at the interface to help highlight the interactive, dynamic nature of the interface working together with the backend The interface can allow the risk managers to drilldown into different dimension of the product and model that are driving the stress losses. For example, if the model results indicate that 1 year interest rate risk factor is driving the losses then that risk factor and its corresponding shock will be reviewed. In such cases the risk managers will look at a time series of such stress loss data points that will help them identify trends related to changes in risk factor and their shocks that drive the stress losses. The Kyber system can then allow the risk manager to also run the new or revised risk factor shocks and run them across multiple Kyber Machine learning models like linear regression, neural networks, random forests, and XGBoost and compare the results by updating the interface with model performance data.

Organizations evaluate Market and Counterparty Credit Risk (MCCR) for Global Risk Management (GRM) to provide independent enterprise-wide oversight and governance of market, counterparty credit, liquidity, and model risks arising from the organization's businesses and operations. Enterprise Market Risk (EMR) is a subset of MCCR. A challenge within MCCR is to identify the most important emerging risks in a large volume of daily market, position, and risk data across many business lines. Embodiments described herein can improve cumbersome processes and provide insights in a more timely manner.

An approach for testing relies on inputting market conditions and portfolio positions into thousands of quantitative finance models scattered across different IT systems and aggregating the Profit and Loss (PnL) values generated by these models to the top of house level.

Embodiments described herein can provide for a risk platform with machine learning models that can train on the results produced by existing models (including on a more abstract level). The trained models can replace existing models once they are properly trained. Embodiments described herein can provide an improved graphical interface to display data related to the models, different risk factors, and scenarios. The interface includes data visualizations to illustrate insights on trends for various financial instruments.

The term shock can refer to relative change in a market variable. For example, a shock can be an interest rate that goes up by 0.01% (e.g., USD-CAD exchange rate goes up by 2%). The term scenario can refer to a collection of market shocks (e.g., the global financial crisis, the Federal reserve raising the interest rate). The term stress or risk can refer to a portfolio reaction to a scenario (e.g. an organization losing $2.3 billion if the financial crisis happens today). The term Value at Risk (VaR) can refer to a measure of the risk of loss for investments (e.g. the 6th worst PnL generated by scenarios based on the past 500 days). The term Stressed VaR (SVaR) can refer to a measure of market risk for stressed market environments and can be based on the Global Financial Crisis. The term regular scenarios can refer to scenarios being examined in VaR and SVaR vectors. The term adverse scenarios refers to 16 particular extreme scenarios EMR considers (e.g. global financial crisis, 9/11).

Embodiments described herein provide a system for responsive stress testing and an interface for responsive stress testing that allows exploration of how historical and hypothetical market scenarios impact different portfolios. The system can have back-end machine learning models that produce computations and a front-end interface with visual elements and selectable indicia through which the users interact with the models.

The system for responsive stress testing can be referred to herein as "Kyber".

FIG. 1 is a diagram that shows how Kyber can integrate into a production system for EMR stress testing. Kyber consumes risk metrics generated by production risk engines on a periodic (e.g. daily) basis as well as data defining market conditions or shocks. Kyber receives data for market shocks and risk metrics as input. Different sets of shocks can define different scenarios. The output of Kyber can be a single PnL value based on the scenario input (set of market shocks).

There is pre-processing of the input data before its fed into Kyber system. This pre-processing can help provide as many "features" as much possible for the Kyber model to use in the machine learning models. For example, for a given scenario and its associated risk factors additional information about the risk factors will be provided as inputs. For Equity risk factors, details such as the sector, country will be provided. For Credit risk factors, details such rating, parent issues or parent company information will be provided. There could also be more complex correlation based risk factor like Equity-Credit or Equity and FX. These type of "expanded" input variables allow Kyber models to take into considerations a large set of feature variables that can help improved the results and performance of the Kyber models. There might also be many macro-economic aspects of the risk profile or stress losses can be captured via these data points. This is the reason the input data is pre-processed and enriched with lot more information before it goes into Kyber models The risk engine can provide risk data to Kyber as a training target.

The daily official end of data stress losses that are been generated are feed along with the stress scenario definition as well as scenario risk factor and their shocks. This training data is generated using the large amount of history from the past 2 years that we have stored in our input stores. Referring to FIG. 1, Risk engine PnL information is currently available going back 2 years. This detailed risk data input acts as training set. Additionally the market shocks from FIG. 1 are also available for a very long history of 10 years+. The model use this training data to identify patterns between the risk engine PnL and the scenarios as well as market data shocks. The Kyber models have "learned" from this training data then those models can help predicts losses for new business dates which have new portfolio changes. It's the availability of long history of both risk engine pnl input data as well the market data shocks that allows the Kyber models to perform deep learning and predicts new scenario shock related stress losses.

Figure 2:
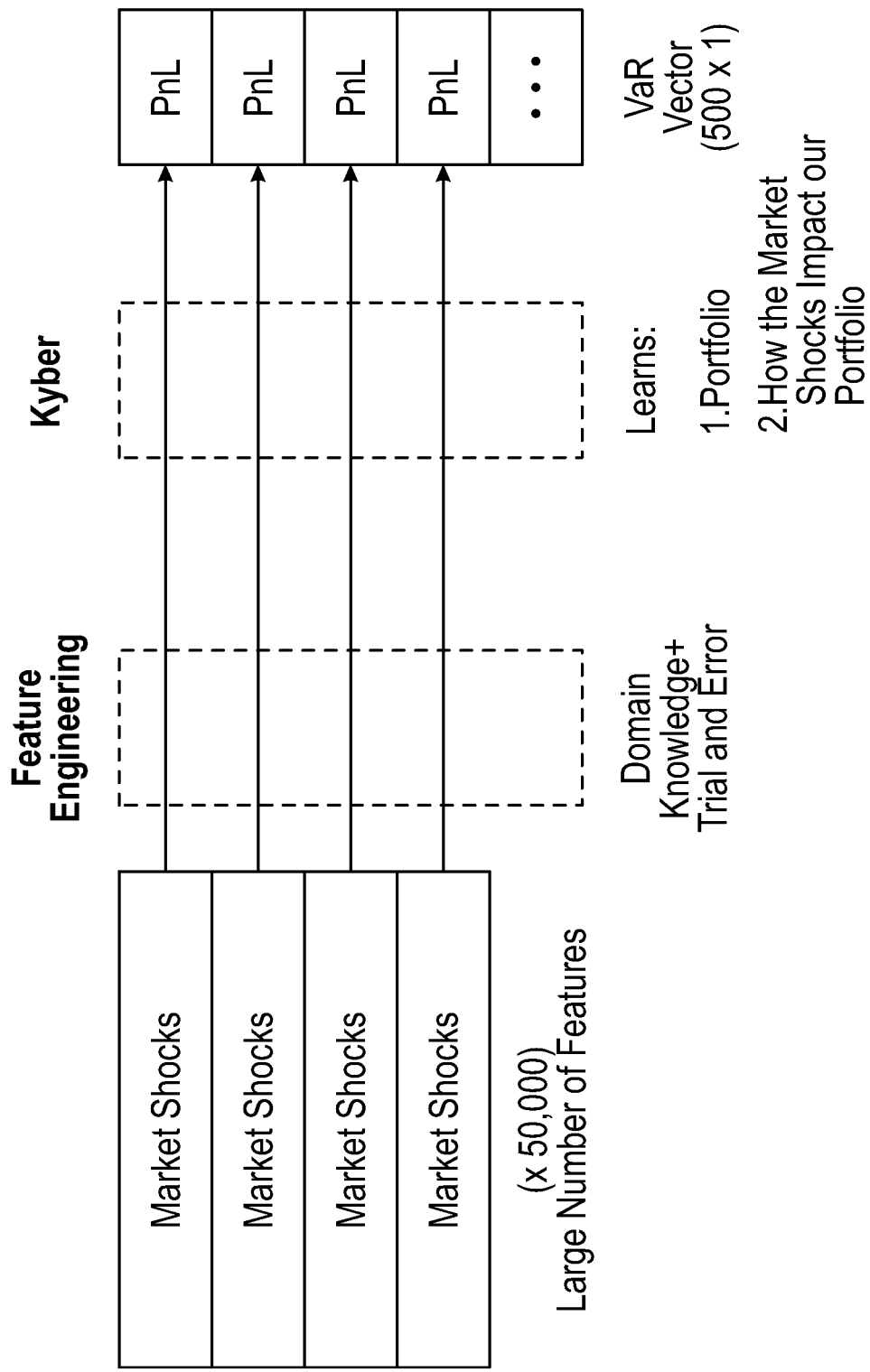
FIG. 2 is a diagram that illustrates specifications of back-end models.

FIG. 2 is a diagram that illustrates Kyber and the back-end models. Market shock data is processed in order to extract market shock features. There can be a large number of features for the market shocks. There can be a feature engineering phase to select sets of risk factor data and market shock data as features based on commands and input from the interface. This can be top of house. For example, foreign exchange options can be linked to different risk factors. An initial set of risk factors can be selected initially and feedback from the learning process can refine the set of features and look for patterns to reduce the features. Kyber receives the features extracted from the risk factor and market shock data. Kyber configures models to learn portfolio objects and how the market shocks impact the portfolio objects. Market shock data can be represented as a large feature set. The system can use feature engineering to reduce the number of features based on patterns and machine learning. Kyber processes the market shock features to generate PnL values. The output data can be a VaR vector, for example.

The system can use different machine learning architectures. Example machine learning architectures include linear regression, neural networks, random forests, and XGBoost.

Figure 3:
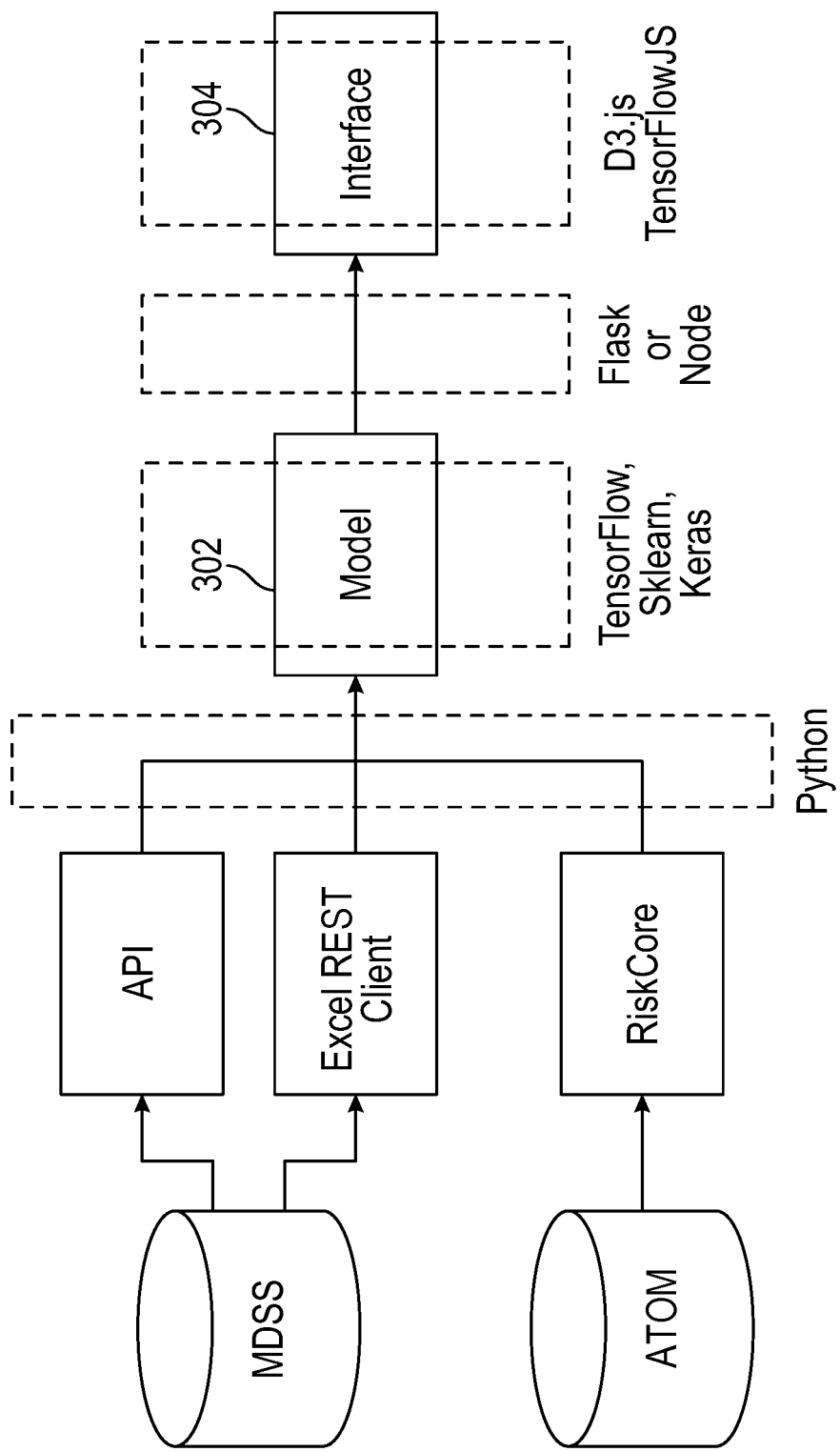
FIG. 3 is a diagram that illustrates the architecture for implementing two components of the system for responsive testing as well as how the components are connected.

FIG. 3 is a diagram that illustrates the architecture for implementing components (models 302, front-end interface 304) of Kyber as well as how the components are connected.

The Kyber system has memory storing the back-end machine learning models 302 that produce enterprise market risk metrics by receiving features extracted from data defining risk factors and market shocks.

The Kyber system has a processor executing instructions stored in the memory to configure the back-end machine learning models 302 with the features extracted from data defining risk factors and market shocks and continuously update the front-end interface 304 with interactive visual elements. The interface 304 has graphical elements corresponding to risk factors and market shocks. The interface 304 has a first set of selectable indicia to adjust values for the risk factors and market shocks to provide selected values for the risk factors and market shocks as input to the processor for the data defining risk factors and market shocks.

The interface 304 has graphical elements corresponding to models 302 of the back-end machine learning models 302.

The interface 304 has a second set of selectable indicia to select the models 302 and adjust scenario data to provided selected scenario data to the processor to generate scenarios.

The interface 304 has graphical elements corresponding to model performance visualizations to visually compare the models 302 with the adjusted values for the risk factors and market shocks over a period of time. The processor generates the model performance data by receiving the adjusted values for the risk factors and market shocks, the models 302 and the adjusted scenario data received from the interface 302 over time periods. The model performance data indicate visually how the risk factors and market shocks impact portfolio objects and PnL values for the portfolio objects.

The interface 304 has graphical elements corresponding to selected scenario output generated by the processor using the adjusted scenario data received from the interface to indicate scenario losses over the period of time.

The processor generates output data as a vector of the model performance data and transmits the output data to the front-end interface 302.

The processor (connected to the memory storing the models 302) and the interface 304 exchange data and commands to generate interactive visual elements that dynamically update as new models 302 are selected at the interface 304, new risk factors features extracted, and new scenarios are generated. The interface 304 can display a list of selectable indicia indicating available models 302 stored on the memory in order to receive selected models 302 at the interface.

In some embodiments, the front-end interface 304 with the graphical elements visually identify a set of risk factors corresponding to stress losses.

In some embodiments, the front-end interface 304 with the graphical elements visually identify model performance by depicting accuracy of predicted stress losses.

In some embodiments, the models 302 comprise official end of day valuation models to measure results of model performance and update models by further calibration.

In some embodiments, the back-end machine learning models 302 comprise challenger models.

In some embodiments, the front-end interface 304 with the graphical elements visually identify risk factors or market variables for incremental improvement in the model performance.

In some embodiments, one or more processors receive metrics generated by production risk engines and market conditions as scenario input risk, and generate a PnL value based on the scenario input risk. The front-end interface 304 has a graphical element that corresponds to the computed PnL value.

In some embodiments, the interface 304 can receive a command to load a particular model and input data to specify ranges of market variables as shock, and display graphical elements to visually depict how the market variables impact a portfolio.

In some embodiments, visual elements of the interface 304 have parallel coordinates where different axis representing different risk factors and different colours represent different PnL values.

In some embodiments, the interface 304 receives a selected model and ranges for each of a plurality of market shocks, and provides instructions to the processor (with access to the memory storing the models 302) to load the selected model 302 and ranges for each of a plurality of market shocks for generating the model performance data.

In some embodiments, the interface 304 has a button to trigger generation of different scenario data structures by the processor (with access to the memory storing the models 302) and output data of values for selected scenarios.

In some embodiments, the interface 304 receives a selection of a different set of models 302 than the models 302 and updates the graphical elements to correspond to the different set of models 302 and updated model performance data for the different set of models. The processor receives the selection of the different set of models 302 to generate the updated model performance data to regenerate the graphical elements of the interface 304.

In some embodiments, the processor (with access to the memory storing the models 302) uses stress scenario to test out different machine learning models 302 to assess model performance by generating updated model performance data.

In some embodiments, the interface 304 receives a selected model and updates the graphical elements to show a number of risk factors and calculated PnL values for the selected model.

In some embodiments, the interface 304 comprises different charts that show predicted and actual values for different scenarios side by side.

In some embodiments, the interface 304 detects hovering over a visual element for a scenario with an input device and in response updates to indicate predicted loss calculations for the scenario.

The Kyber system can use different data sources and the processor can access the data sources to receive risk factors and market shock data. For example, the system can use data source MDSS which contains market conditions for every day. The system can use data source ATOM, which provides aggregated risk metrics (such as VaR and SVaR) throughout the business hierarchy. The models pull inputs from MDSS and target outputs (ground truth) from ATOM. The data sourcing process can be implemented using application programming interfaces (APIs) and a client application. The back-end models can be written in Python, for example, and using the Keras library in TensorFlow. This is an example implementation. The models and corresponding metadata can be saved in .json and binary files. These model files are passed to the client side through Node. The front-end then renders the models using TensorFlowJS and visualizes the results through D3.js.

MDSS is the Market data and scenario shocks systems and it has large amount of historical market data, risk factors as well as scenario shocks stored across a long (10 years+) history. ATOM is an example Aggregation tool of Market Risk. ATOM is a big data enabled store (Hadoop) and has risk engine pnl from last 2 years. Both these systems provide training data input. The fact that Kyber models have access to this large historical data set provides a advantage for Kyber models to perform deep learning. Each of these systems (MDSS and ATOM) also perform different pre-processing. MDSS for example gets data from multiple vendor sources as well as many internal Front office pricing sources. This data can undergo transformation to form a consistent set of store for the entire banks market data and risk factors. This consistent input helps Kyber take advantage and take in this data input. ATOM perform pre-processing largely to support daily risk management as well as backtesting of risk engine PnL.

This architecture benefits from the language-agnostic nature of TensorFlow, improving scalability by pushing the forward pass computations (which consume relatively few resources) to the client side. Embodiments described herein relate to implementing machine learning operations in a client browser to generate model performance data for the interface. The TensorFlow training and TensorFlow rendering on the front end enables the change in the user interface design. For example, the visual elements of the interface can have parallel coordinates where different axis represent different risk factors and different colours represent different PnL values. The model training is implemented by the backend components. Prediction values are generated by TensorFlow to generate the prediction on the client side. Distributing operations to the client browser can help with scalability.

Figure 4:
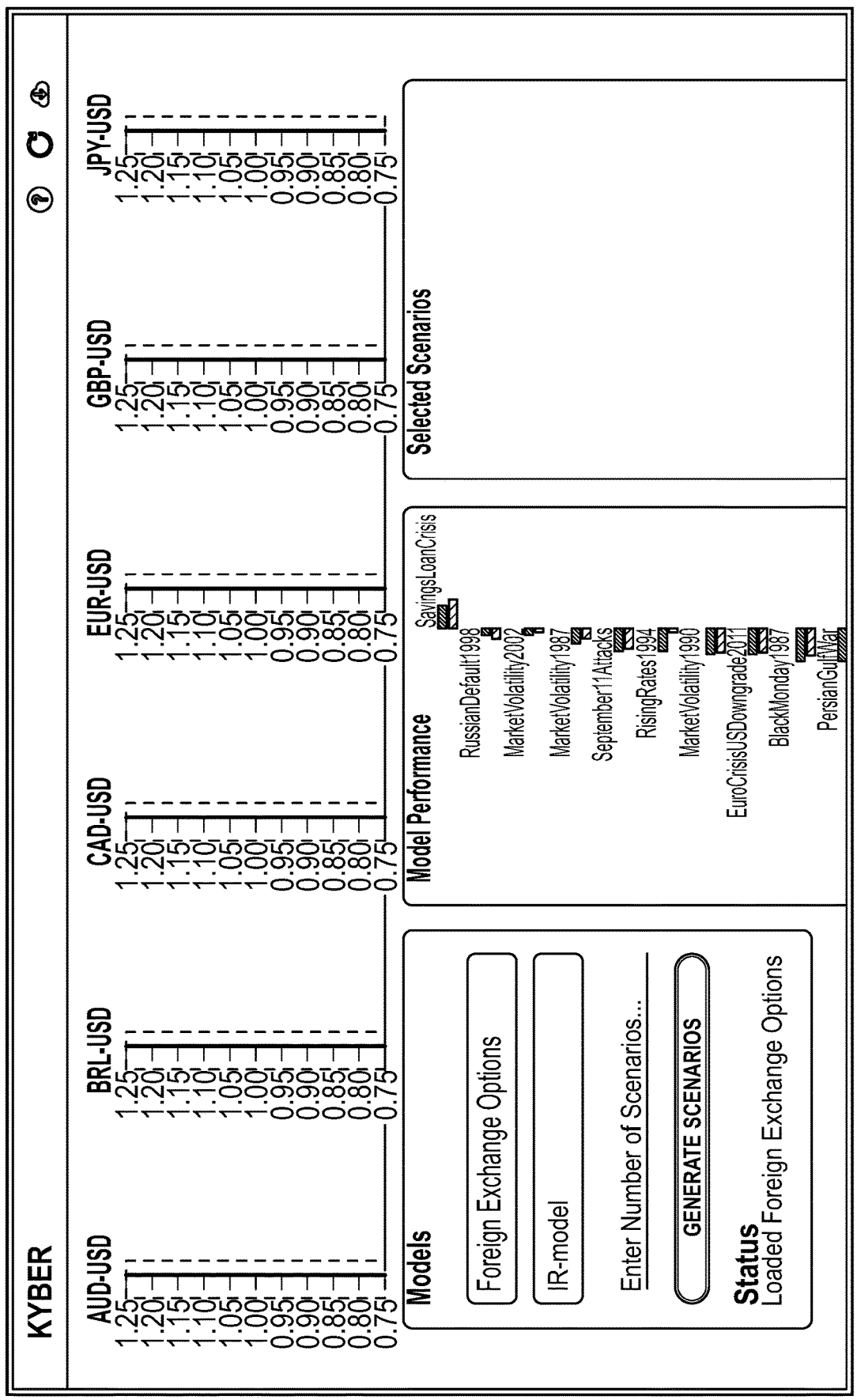
FIG. 4 is a screenshot of an interface with selectable indicia for models, model performance, and selected scenarios.

FIG. 4 is a screenshot of an interface for the system. For this example, the user has the option to load a particular model, specify ranges of each market variable (shock), and investigate how the market variables impact the organization's portfolio by looking at PnL evaluations for the desired number of random scenarios. The output of system can be a D3.js file that provides the visualization. In this example there are visual elements representing 4 stock indices (CAD, US, EUR, GB) as different risk factors. The interface has visual elements corresponding to different models and a button to trigger generation of different scenario data structures. The interface has visual elements that represent model performance and values for the selected scenarios. The interface enables the input of different models and risk factors to update the visual elements for model performance and values for the selected scenarios dynamically. The scales represent relative change. The interface can be used to select a model and the visual elements will update to show the number of risk factors and calculated PnL values. When the system loads a model then it shows extreme scenarios to ensure the model actually works. The user can hover over different scenarios and can select the subset of risk factors.

Kyber consumes risk metrics generated by production risk engines on a periodic (e.g. daily) basis and market conditions to generate data used to control interface and render different visual elements. The interface can display output such as PnL values based on the scenario input.

The interface enables interaction with the models results and visually identify which risk factors are driving the stress losses. The Kyber system can allow for the same stress scenario to test out different machine learning models to assess model performance and accuracy of predicted stress losses. The Kyber model performance can be compared to the official end of day (EOD) full revaluation based pricing (valuation) models used by front office and trading. This can allow measurement of the results of Kyber model performance and update models by further calibration.

For calibration, Kyber models stress losses are compared to historical PnL results. This comparison will typically yield any drift or variances between the official End of day (EOD) full revaluation based pricing models and the Kyber models. As this time some further analysis is perform the identified drift in the risk factors or shock values. For example, a credit risk factor of CDS 5 years was commonly used but due to changing market conditions, the models may need another input say CDS 7 year. Additional calibration is performed by comparing the shocks for the scenarios with spreads observed in the current market conditions. Additional calibration aspects may include correlation and inclusion of other new emerging risk factors. As another example, for a global pandemic, a new set of factors and calibration of existing models may be required.

The Kyber models can also act as challenger models to the official EOD full revaluation based pricing (valuation) models used by front office and trading.

The interface provides visual elements for results comparison that can allow risk managers to identify missing risk factors or market variables that can be further refined and stress shocks to be added. This can allow for incremental improvement in the model performance and cater to new stress scenarios that might emerge from the markets.

The Kyber model stress losses can be further investigated by drilling down into multiple risk attributes or dimension like the product type or the type of risk factor (discount curve). See for example, FIG. 18. We can also run and investigate a particular scenario by re-running the Kyber models but with only a sub-set of risk factors shocks and the results compared. This type of step wise approach will allow the Kyber models to respond by running under original as well as derived sub-sets. This capability will allow the model results to be further understood and as increasing granularity of details like product types or market risk factors. This capability allows the constants monitoring, measurement, calibration and improvement to the model performance.

The interface displays visual elements that represent risk metrics computed by the system. As an example, how much will the foreign exchange rate be impacted? The interface can display visual elements to reflect this example. When the interface initially loads it can enable selection of different models—such as foreign exchange options.

Figure 5:
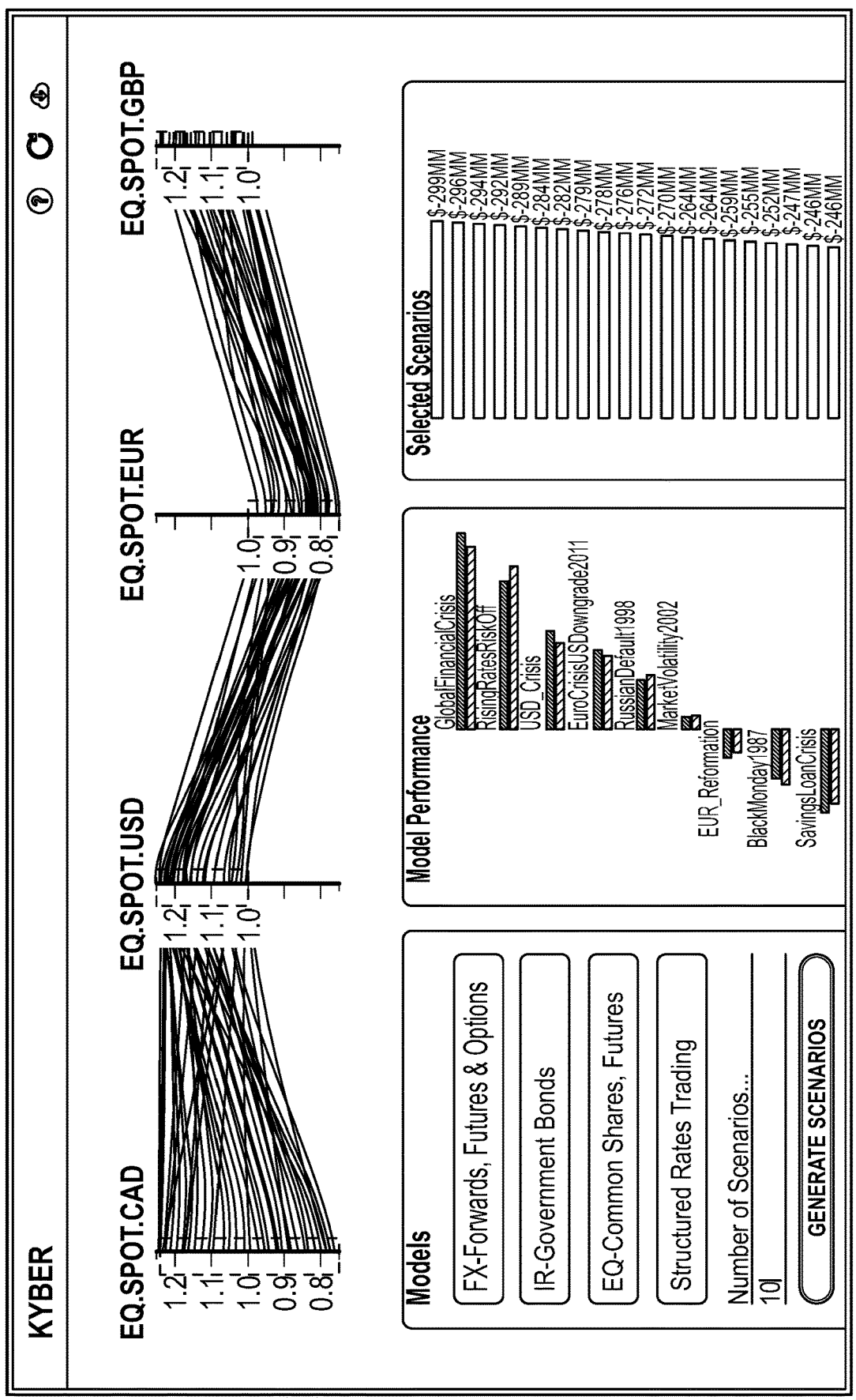
FIG. 5 is a screenshot of an interface with selectable indicia for models, model performance, and selected scenarios.

FIG. 5 is a screenshot of an interface for the system when it initially loads.

The Kyber system has memory storing the back-end machine learning models that produce enterprise market risk metrics by receiving features extracted from data defining risk factors and market shocks.

The Kyber system has a processor executing instructions stored in the memory to configure the back-end machine learning models with the features extracted from data defining risk factors and market shocks and continuously update the interface with interactive visual elements. The interface has graphical elements corresponding to risk factors and market shocks. The interface has a first set of selectable indicia to adjust or display values for the risk factors and market shocks to provide selected values for the risk factors and market shocks as input to the processor for the data defining risk factors and market shocks. As shown, ranges for values of the market shocks and risk factors are displayed and can be adjusted by selecting components of the interface. The adjustments can trigger updates to the model and model performance which in turn triggers updates to the visual elements of the interface.

The interface has graphical elements corresponding to models of the back-end machine learning models. The interface has a second set of selectable indicia to select the models and adjust scenario data to provided selected scenario data to the processor to generate scenarios. As shown, the interface can display available models and enable the user to select one or models to update or configure with features extracted from the data for risk factors and market shocks.

The interface has graphical elements corresponding to model performance visualizations to visually compare the models with the adjusted values for the risk factors and market shocks over a period of time. In this example, the interface has graphs showing model performance based on the models that were updated or configured with features extracted from the data for risk factors and market shocks. The processor generates the model performance data by receiving the adjusted values for the risk factors and market shocks, the models and the adjusted scenario data received from the interface over time periods. The model performance data indicate visually how the risk factors and market shocks impact portfolio objects and PnL values for the portfolio objects.

The interface has graphical elements corresponding to selected scenario output generated by the processor using the adjusted scenario data received from the interface to indicate scenario losses over the period of time. In this example, the interface has bar graphs for selected scenarios to show losses over the period of time to facilitate comparison or benchmarking.

The processor (connected to the memory storing the models) and the interface exchange data and commands to generate interactive visual elements that dynamically update as new models are selected at the interface, new risk factor features extracted, and new scenarios are generated. The interface can display a list of selectable indicia indicating available models stored on the memory in order to receive selected models at the interface. The processor generates output data as a vector of the model performance data and transmits the output data to the front-end interface.

In some embodiments, the front-end interface with the graphical elements visually identify a set of risk factors corresponding to stress losses. In some embodiments, the front-end interface with the graphical elements visually identify model performance by depicting accuracy of predicted stress losses. In some embodiments, the models comprise official end of day valuation models to measure results of model performance and update models by further calibration. In some embodiments, the back-end machine learning models comprise challenger models. In some embodiments, the front-end interface with the graphical elements visually identify risk factors or market variables for incremental improvement in the model performance.

In some embodiments, one or more processors receive metrics generated by production risk engines and market conditions as scenario input risk, and generate a PnL value based on the scenario input risk. The front-end interface has a graphical element that corresponds to the computed PnL value.

In some embodiments, the interface can receive a command to load a particular model and input data to specify ranges of market variables as shock, and display graphical elements to visually depict how the market variables impact a portfolio.

In some embodiments, visual elements of the interface have parallel coordinates where different axis representing different risk factors and different colours represent different PnL values.

In some embodiments, the interface receives a selected model and ranges for each of a plurality of market shocks, and provides instructions to the processor (with access to the memory storing the models) to load the selected model and ranges for each of a plurality of market shocks for generating the model performance data.

In some embodiments, the interface has a button to trigger generation of different scenario data structures by the processor (with access to the memory storing the models) and output data of values for selected scenarios.

Figure 6:
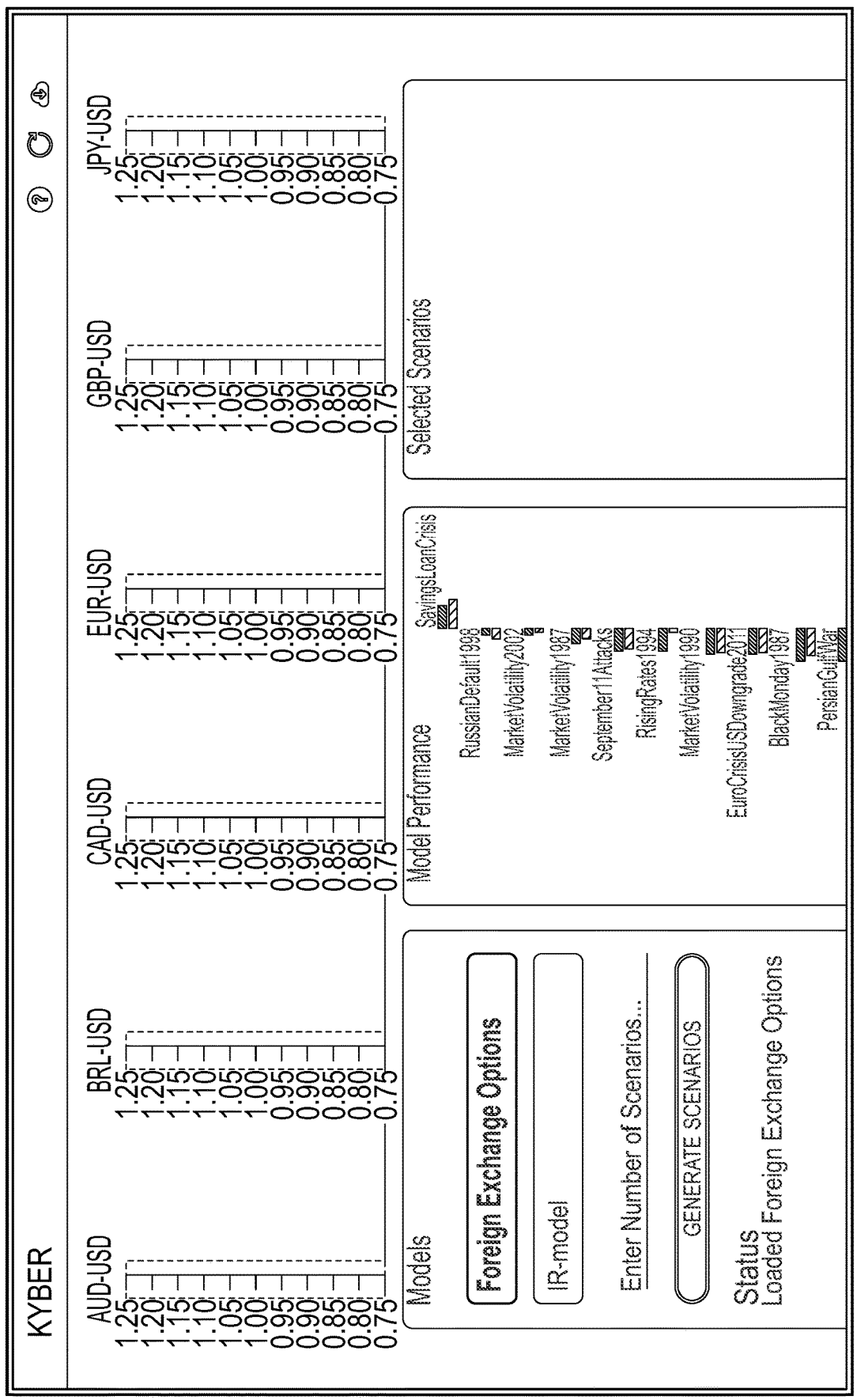
FIG. 6 is a screenshot of an interface with selectable indicia for models.

FIG. 6 is a screenshot of an interface for the system when the foreign exchange model is loaded into interface out of the available models. The system can display visual elements representing different models for selection by the user. Upon selection, the system can load the selected model into interface and the processor can generate output data for the interface to display as updated visual elements.

The interface displays models that are stored in memory accessible by the processor and available for the Kyber system.

In some embodiments, the interface receives a selection of a different set of models than initially selected models and updates the graphical elements to correspond to the different set of models and updated model performance data for the different set of models. The processor receives the selection of the different set of models to generate the updated model performance data to regenerate the graphical elements of the interface. The selection of models triggers re-computation by the processor and re-rendering by the interface with updated visual elements.

In some embodiments, the processor (with access to the memory storing the models) uses stress scenario to test out different machine learning models to assess model performance by generating updated model performance data. The different machine learning models are displayed at interface for selection by the user. In some embodiments, the interface receives a selected model and updates the graphical elements to show a number of risk factors and calculated PnL values for the selected model. In some embodiments, the interface comprises different charts that show predicted and actual values for different scenarios side by side.

In some embodiments, the interface detects hovering over a visual element for a scenario with an input device and in response updates to indicate predicted loss calculations for the scenario. The detected hovering can trigger automatic updates at the interface to display additional metrics computed by the processor using the models and the extracted features.

As shown in FIG. 6, the interface has graphical elements corresponding to models of the back-end machine learning models. The interface has a set of selectable indicia to select the models and adjust scenario data to provided selected scenario data to the processor to generate scenarios. As shown, the interface can display available models and enable the user to select one or models to update or configure with features extracted from the data for risk factors and market shocks.

Figure 7:
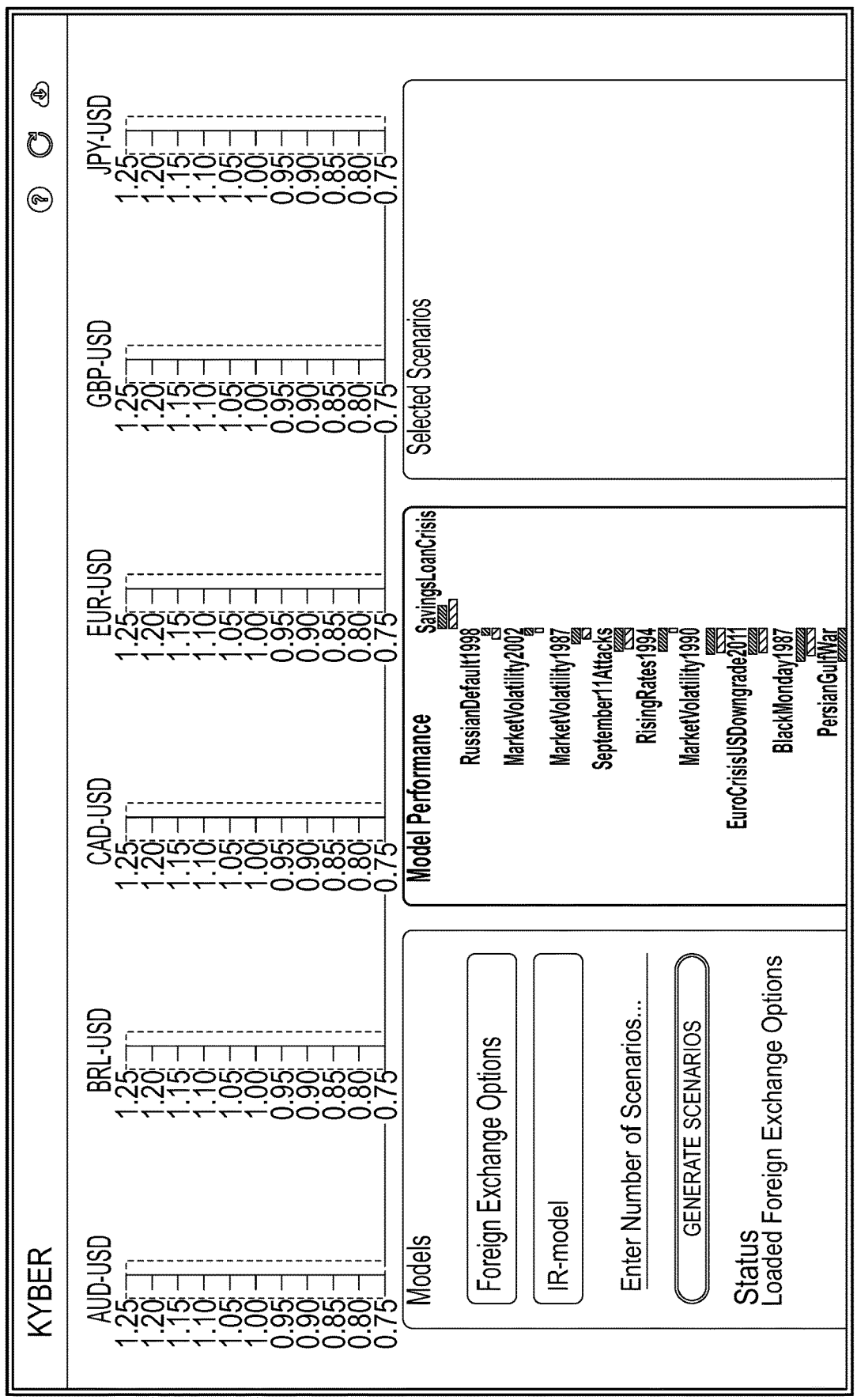
FIG. 7 is a screenshot of an interface with selectable indicia for model performance.

FIG. 7 is a screenshot of an interface for the system showing visual elements representing model performance. To make sure the model works, the visual elements can illustrate different charts that show predicted and actual values for historical extreme scenarios side by side. FIG. 7 shows a display of model performance.

The interface has graphical elements corresponding to model performance visualizations to visually compare the models with the adjusted values for the risk factors and market shocks over a period of time. In this example, the interface has graphs showing model performance based on the models that were updated or configured with features extracted from the data for risk factors and market shocks The processor generates the model performance data by receiving the adjusted values for the risk factors and market shocks, the models and the adjusted scenario data received from the interface over time periods. The model performance data indicate visually how the risk factors and market shocks impact portfolio objects and PnL values for the portfolio objects.

The processor (connected to the memory storing the models) and the interface exchange data and commands to generate interactive visual elements that dynamically update as new models are selected at the interface, new risk factor features extracted, and new scenarios are generated. The interface can display a list of selectable indicia indicating available models stored on the memory in order to receive selected models at the interface. The processor generates output data as a vector of the model performance data and transmits the output data to the front-end interface.

Figure 8:
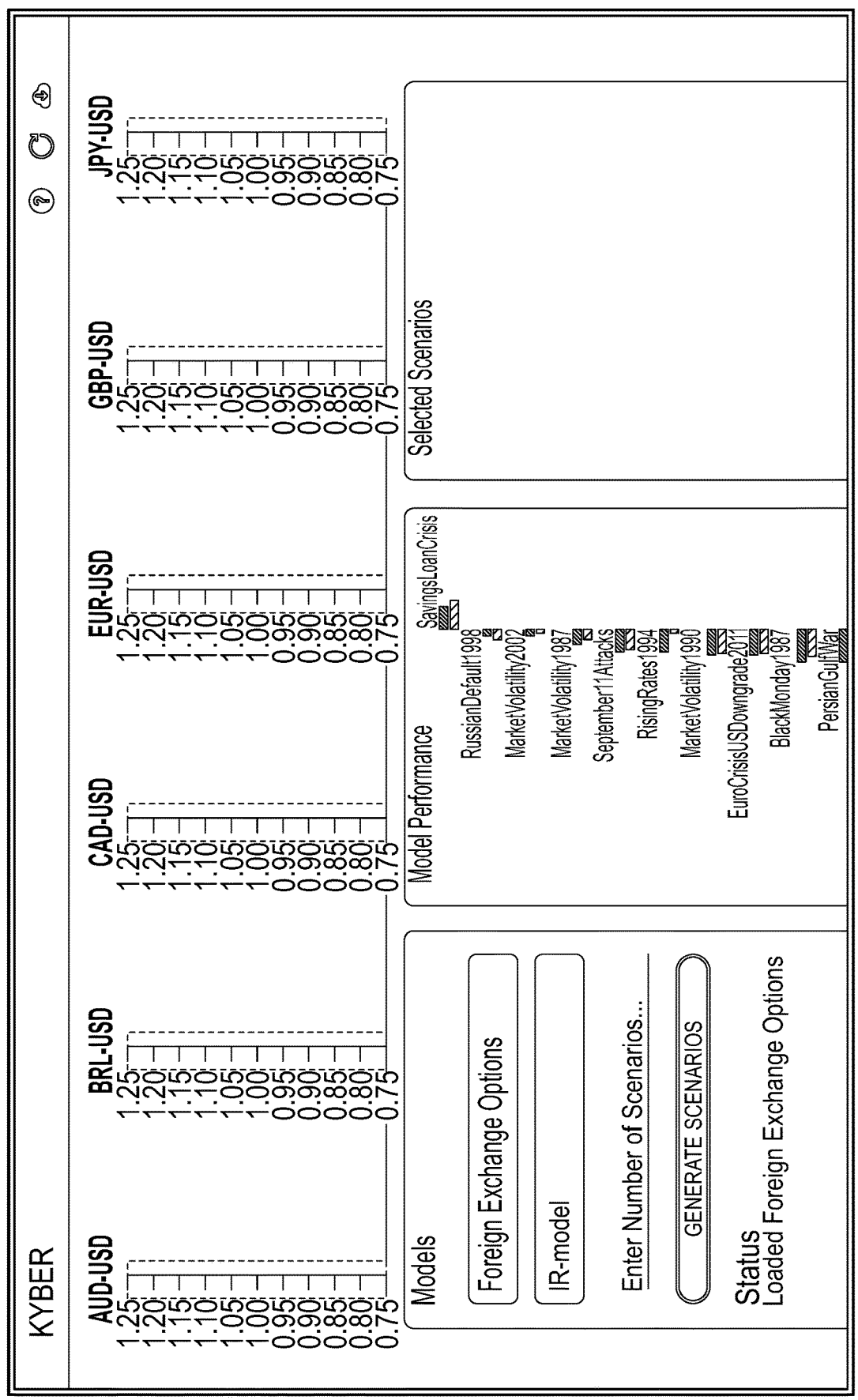
FIG. 8 is a screenshot of an interface with selectable indicia for factors.

FIG. 8 is a screenshot of an interface for the system showing visual elements representing different currencies within a trading portfolio. The visual elements can illustrate different columns that show the biggest currencies for a trading portfolio side by side. In this example, the columns are labeled AUD-USD, BRI-USD, CAD-USD, EUR-USD, GBP-USD, JPY-USD.

The Kyber system has a processor executing instructions stored in the memory to configure the back-end machine learning models with the features extracted from data defining risk factors and market shocks and continuously update the interface with interactive visual elements. The interface has graphical elements corresponding to risk factors and market shocks.

Figure 9:
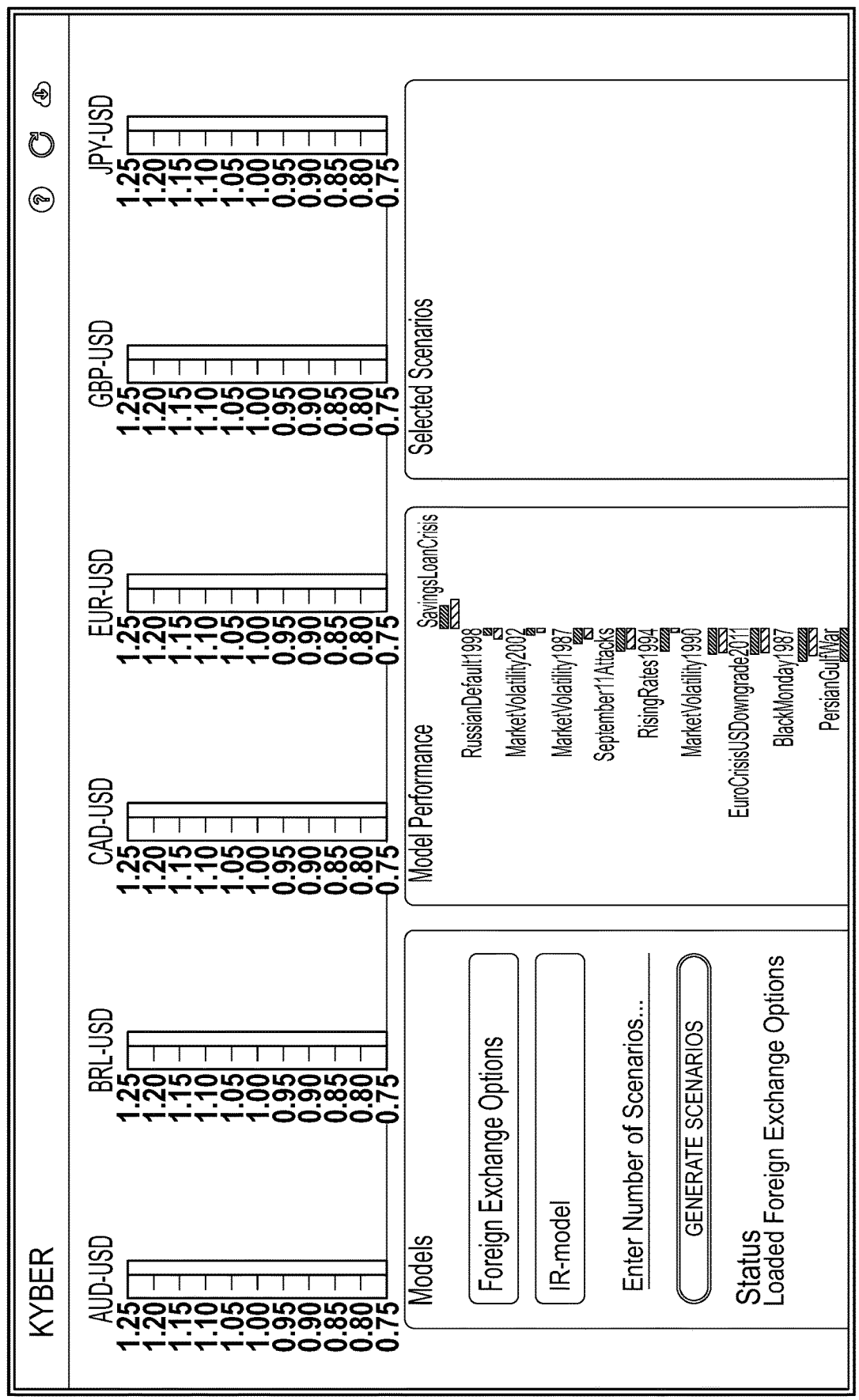
FIG. 9 is a screenshot of an interface with selectable indicia for factor ranges.

FIG. 9 is a screenshot of an interface for the system showing visual elements representing the relative changes that will be applied to different exchange rates.

The interface has a first set of selectable indicia to adjust or display values for the risk factors and market shocks to provide selected values for the risk factors and market shocks as input to the processor for the data defining risk factors and market shocks. As shown in FIG. 9 ranges for values of the market shocks and risk factors are displayed and can be adjusted by selecting components of the interface. The adjustments can trigger updates to the model and model performance which in turn triggers updates to the visual elements of the interface.

Figure 10:
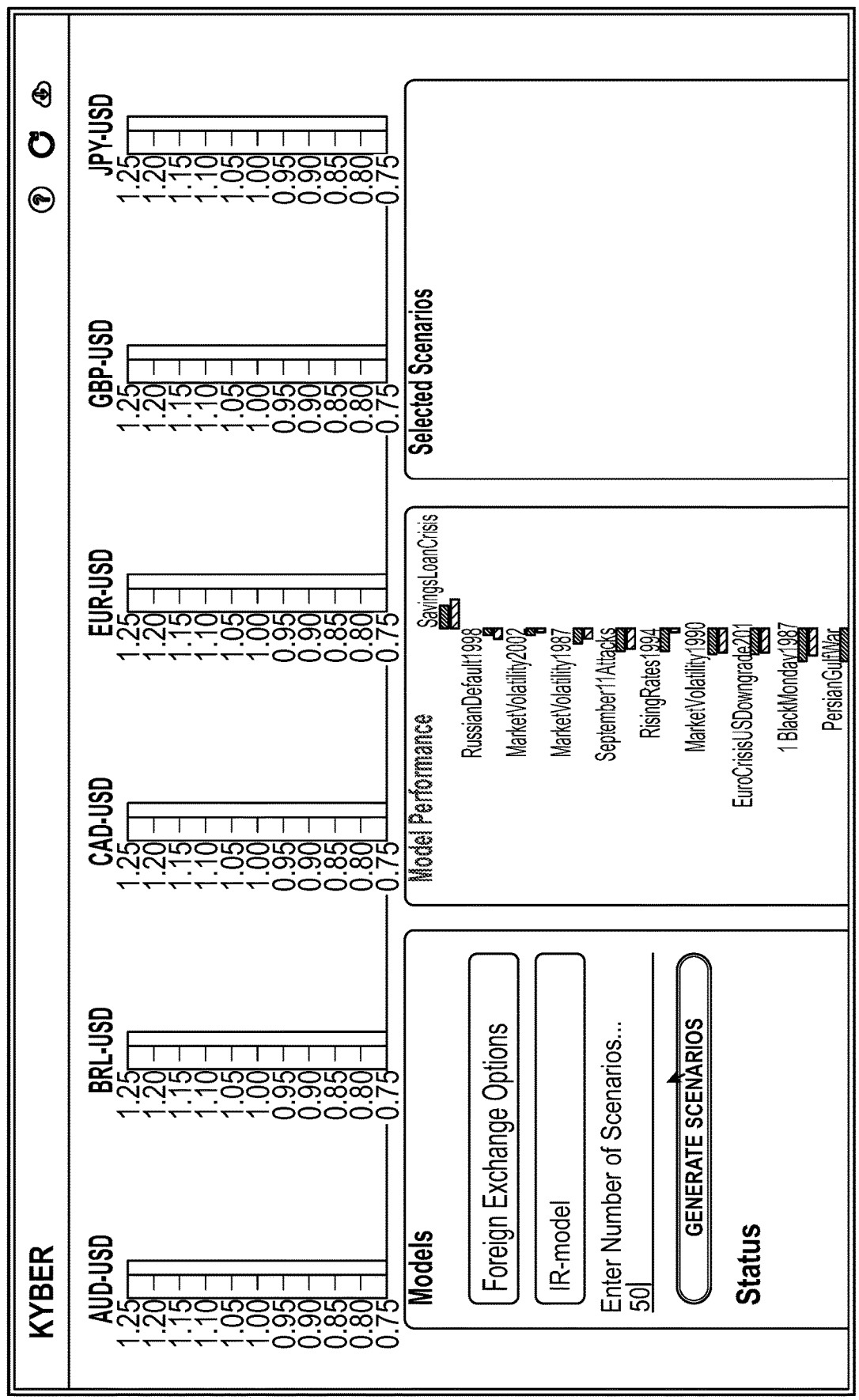
FIG. 10 is a screenshot of an interface for scenario generation.

FIG. 10 is a screenshot of an interface for the system showing visual elements to trigger different configurations of scenarios. The interface can configure 50 different hypothetical scenarios in this example. The interface can have a region for displaying data for risk factors and market shocks, a region for displaying data for models (and selection thereof), a region for displaying data for model performance, and a region for displaying data for scenarios. Selections and updates within one region and in turn trigger updates to the display of data in other regions. The regions are connected based on computations by the processor (with the back end models) so that a selection or input for one region can trigger updates to another region.

Figure 11:
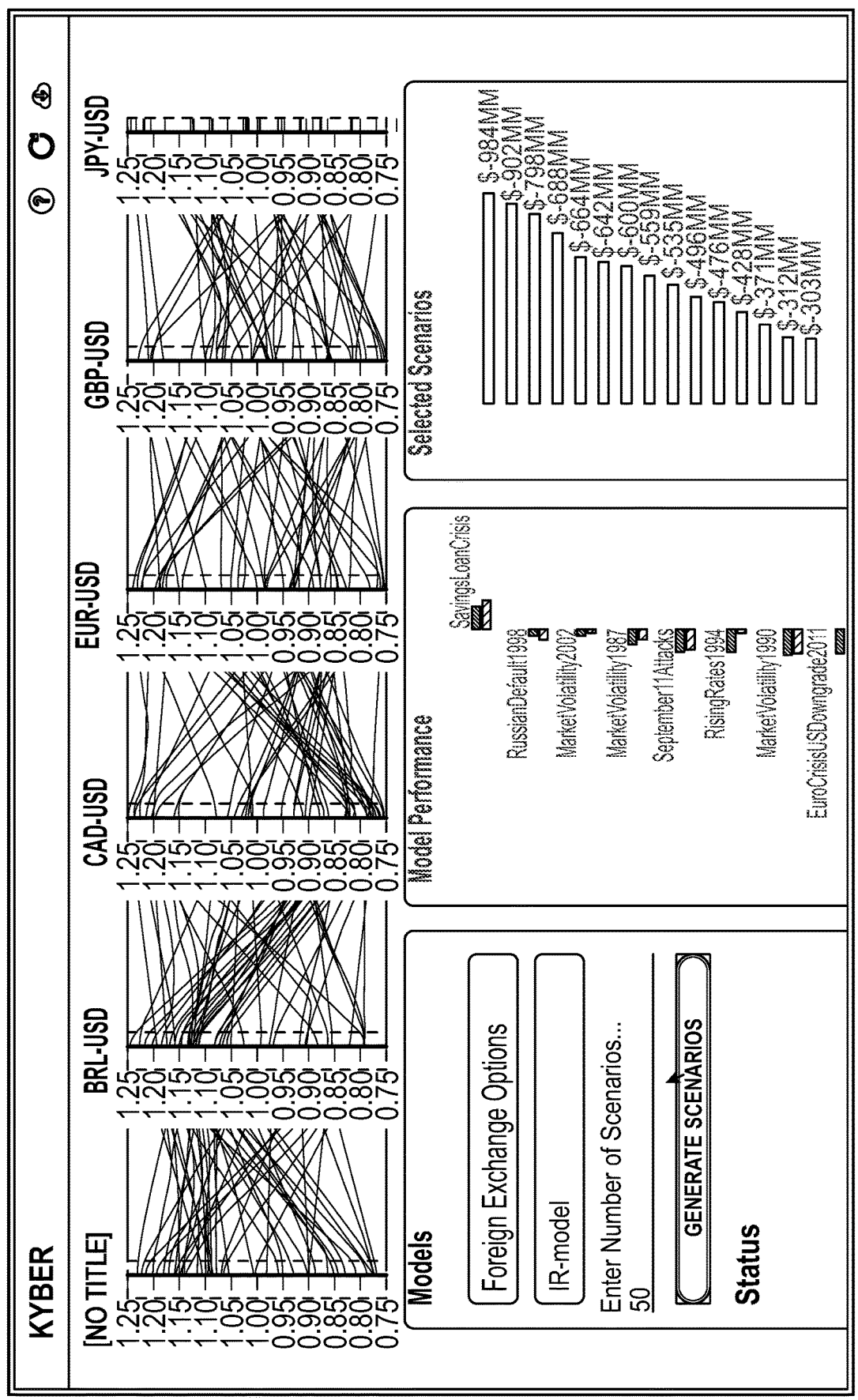
FIG. 11 is a screenshot of an interface for responsive risk testing.

FIG. 11 is a screenshot of an interface for the system showing visual elements representing different scenarios. The lines can represent hypothetical scenarios where a trading portfolio loses money and makes money. The interface enables input commands to interact with the backend system to update the visual elements dynamically to represent different scenarios, models, etc.

As shown in FIG. 11, the interface has graphical elements corresponding to selected scenario output generated by the processor using the adjusted scenario data received from the interface to indicate scenario losses over the period of time. In this example, the interface has bar graphs for selected scenarios to show losses over the period of time to facilitate comparison or benchmarking.

The interface can have a region for displaying out data for risk factors and market shocks which is shown as a graph or chart in this example. The interface can have a region for displaying data for models (and selection thereof). The interface can have a region for displaying data for model performance. The interface can have a region for displaying data for selected scenarios. Selections and updates within one region and in turn trigger updates to the display of data in other regions.

Figure 12:
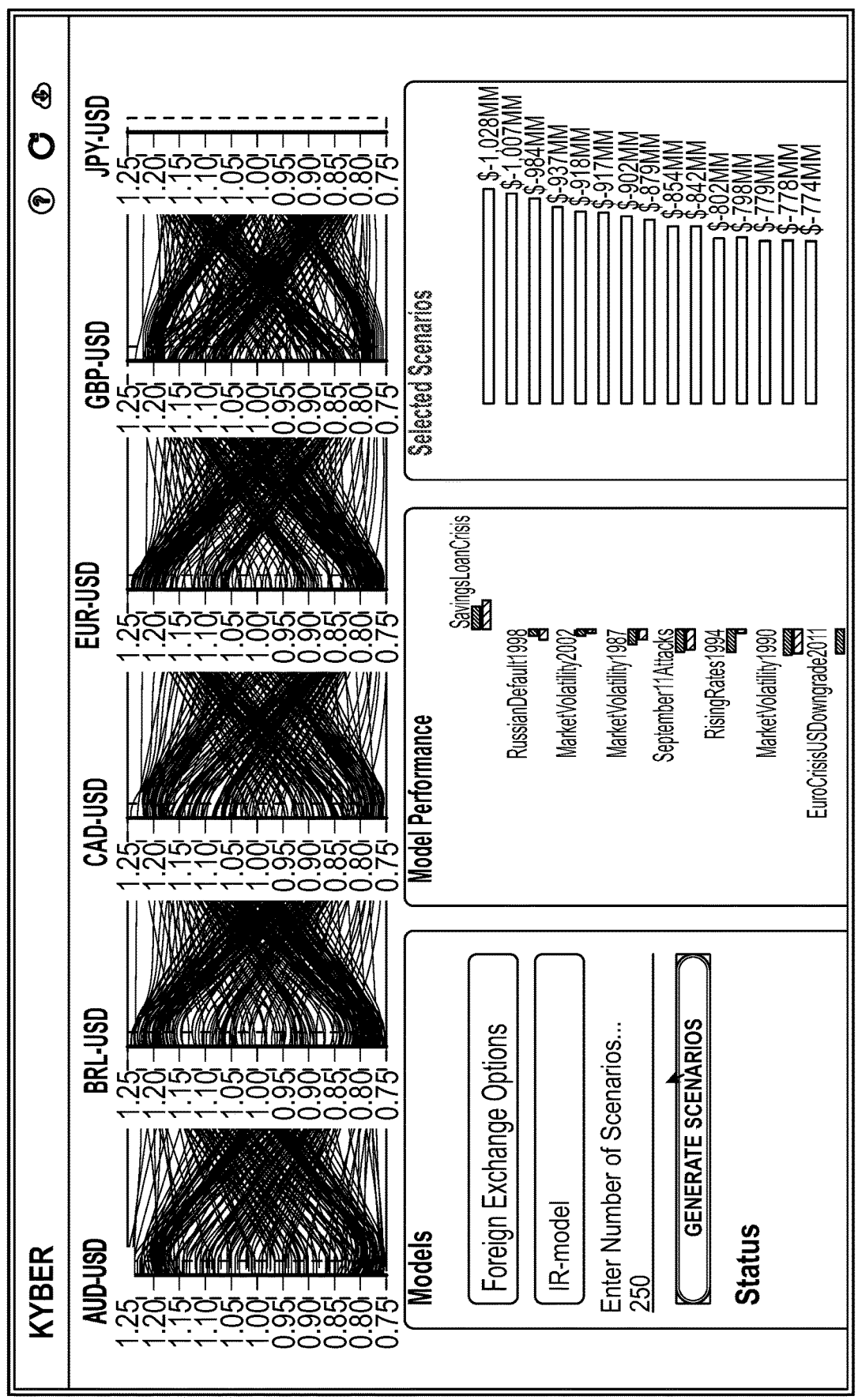
FIG. 12 is a screenshot of an interface for responsive risk testing.

FIG. 12 is a screenshot of an interface for the system showing visual elements representing more scenarios. The interface can be used to keep adding scenarios to generate different visual elements to provide insights into the backend data. The interface can instantly generate more scenarios and the visual elements can provide insights to spot trends in the data. For example, the interface highlights that an exposure for the trading portfolio is the CAD-USD exchange rate.

FIG. 12 shows updates to the different regions based on different models, scenarios, and data for risk factors and market shocks.

Figure 13:
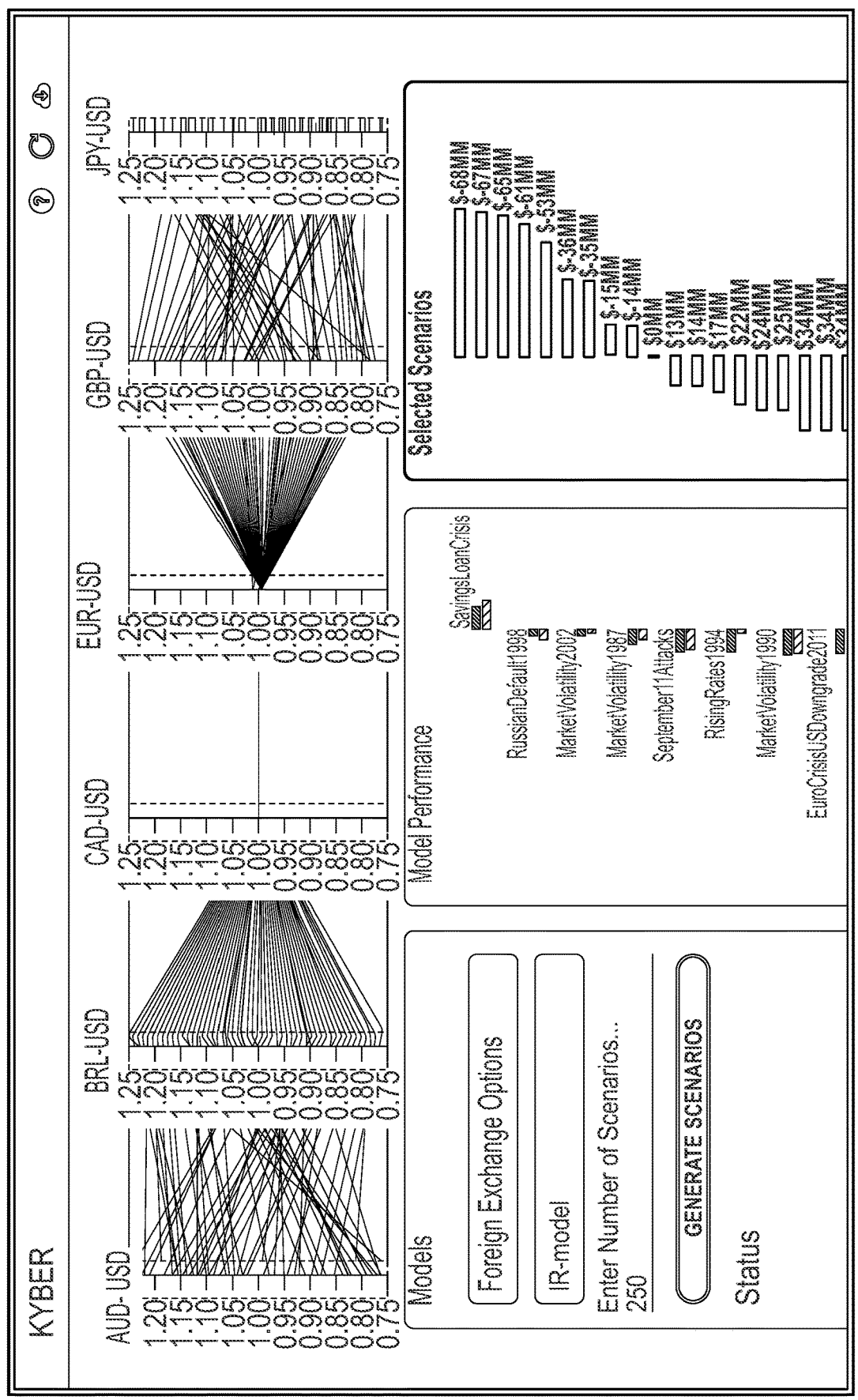
FIG. 13 is a screenshot of an interface for selecting scenarios.

FIG. 13 is a screenshot of an interface for the system showing visual elements representing how much money the trading portfolio makes or loses. FIG. 13 shows a region for displaying data for selected scenarios. In this example, the data shows profits or losses for portfolio objects generated by the processor using the models.

Figure 14:
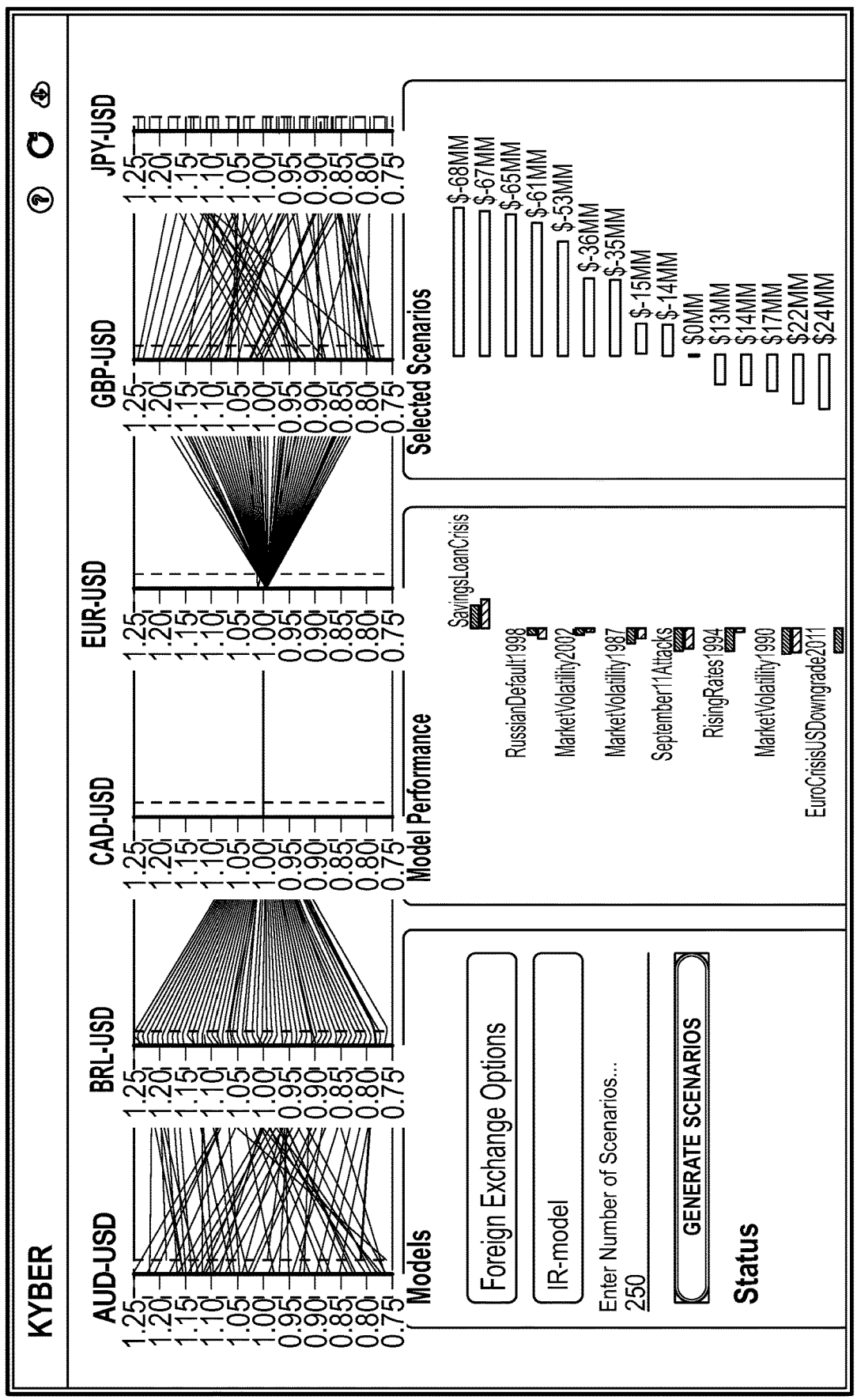
FIG. 14 is a screenshot of an interface for responsive risk testing.

FIG. 14 is a screenshot of an interface with visual elements generated in response to hovering over a visual element with an input device such as a mouse pointer or touch screen. In this example, the visual element response indicates that a foreign exchange trading portfolio would lose $68 million.

In this example, FIG. 14 has an interface with a region for displaying out data for risk factors and market shocks which is shown as a graph or chart in this example. The interface can have a region for displaying data for models (and selection thereof). The interface can have a region for displaying data for model performance. The interface can have a region for displaying data for selected scenarios. Selections and updates within one region and in turn trigger updates to the display of data in other regions.

Figure 15:
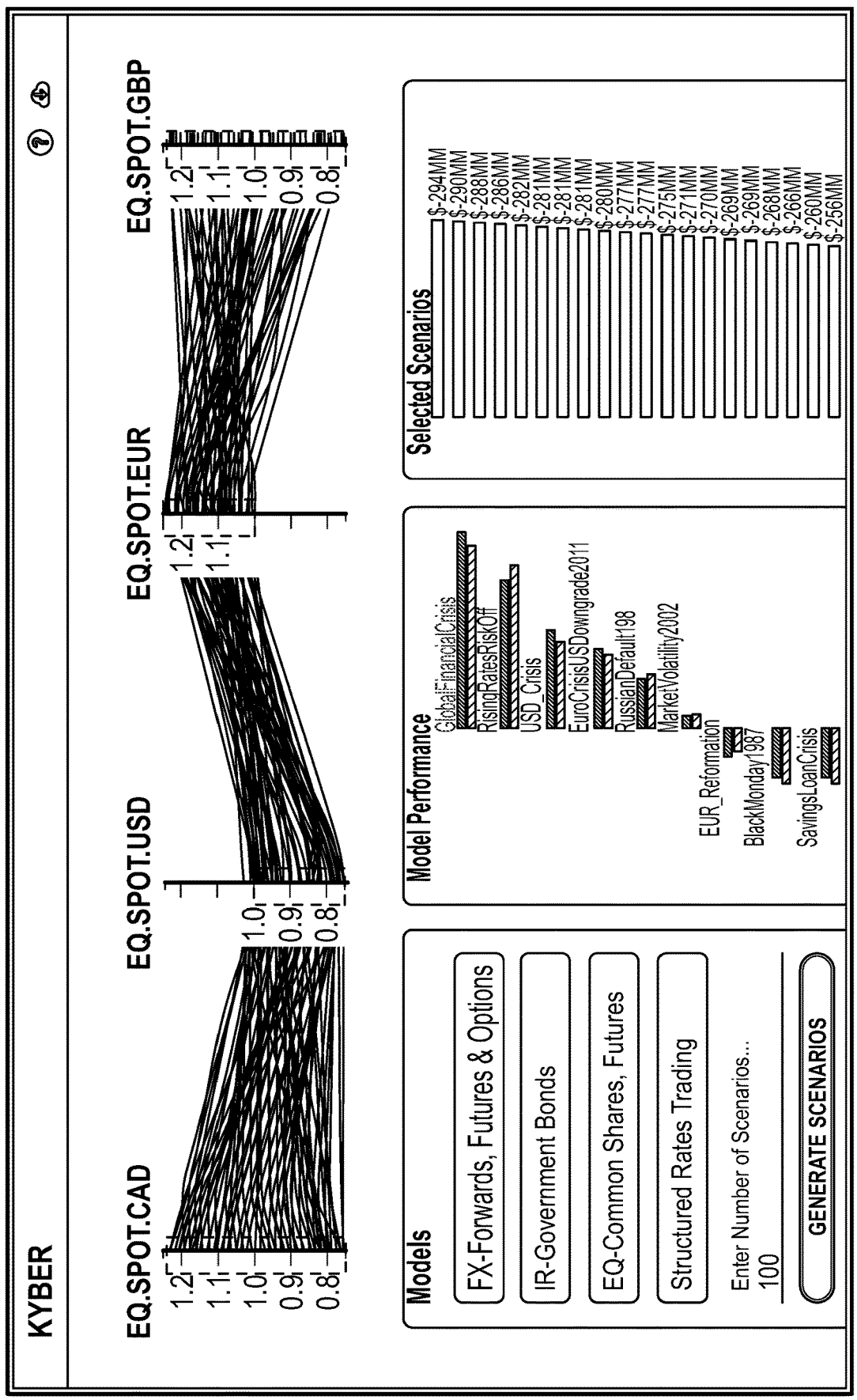
FIG. 15 is a screenshot of an interface for responsive risk testing.

FIG. 15 is a screenshot of an interface for the system showing different scenarios and corresponding data for a trading portfolio. FIG. 15 shown another update from the interface shown in FIG. 14 to highlight the dynamic, changing nature of the interface based on computations received from the processor in response to selections of models and risk factors at the interface. The interface and processor work together to trigger re-computations with the models and visual updates.

FIG. 16 is an example interface for responsive risk testing. The interface generates visual elements representing computed scenario data over time periods (e.g. day over day) and across different business lines. In this example, the interface has visual elements that indicate that equity stress has the worst case loss on the portfolio. The period of time can be updated. For example, the period of time can be received as input data at the interface. The period of time can be shorter or longer to show different trends using the visual elements. The processor generates performance data for the different time periods.

Figure 17:
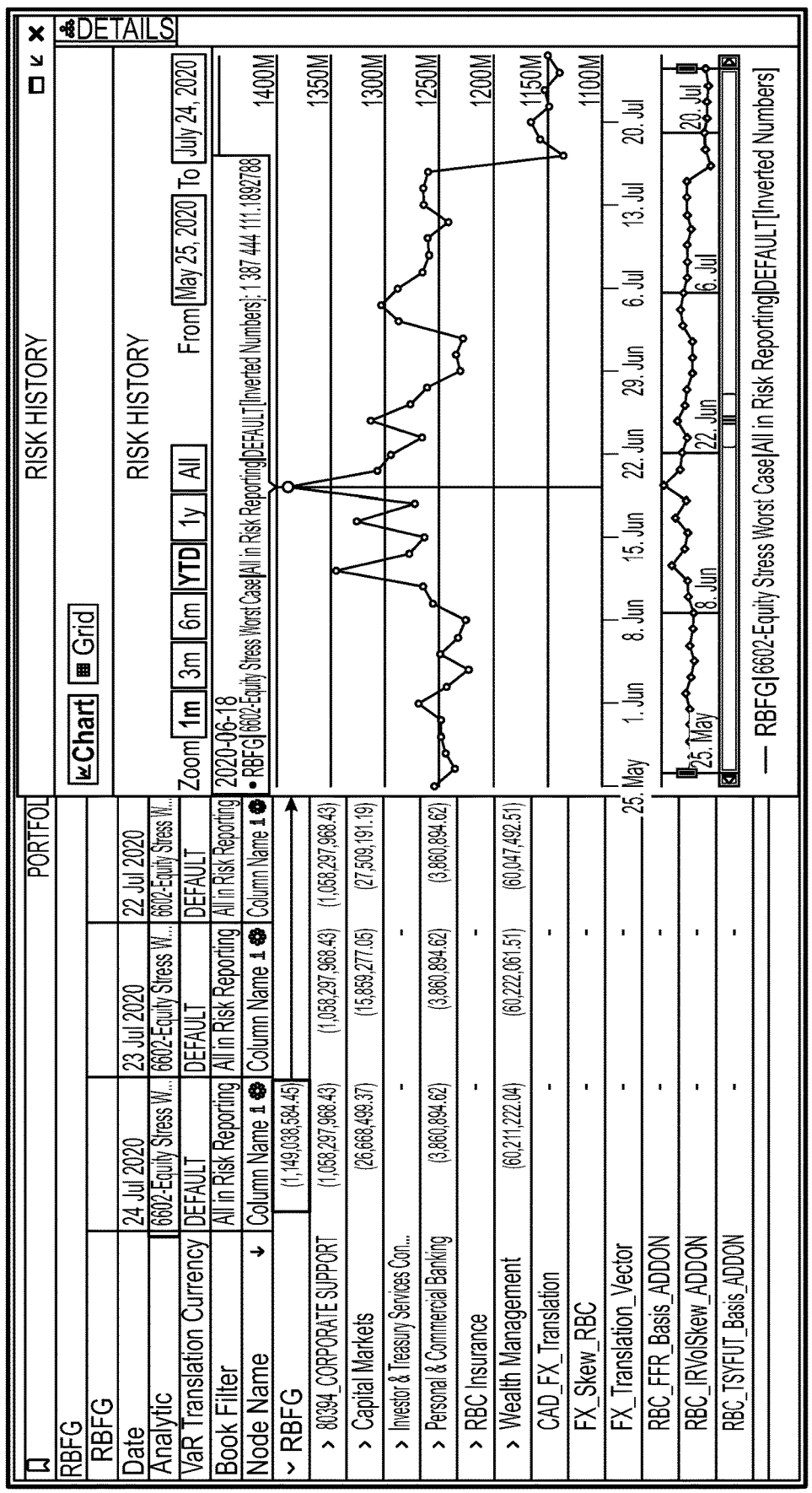
FIG. 17 is an example interface of the system for responsive risk testing.

FIG. 17 is an example interface for responsive risk testing. The interface generates visual elements representing computed scenario data. In this example, the interface visual elements indicate scenario losses over longer periods of time. The visual elements representing data over longer periods of time facilitate visualizations of trend data as well as model performance for stress losses. Equity stress has the worst case loss in this example portfolio. The interface has visual elements that indicate equity stress has the worst case loss on the portfolio.

Figure 18:
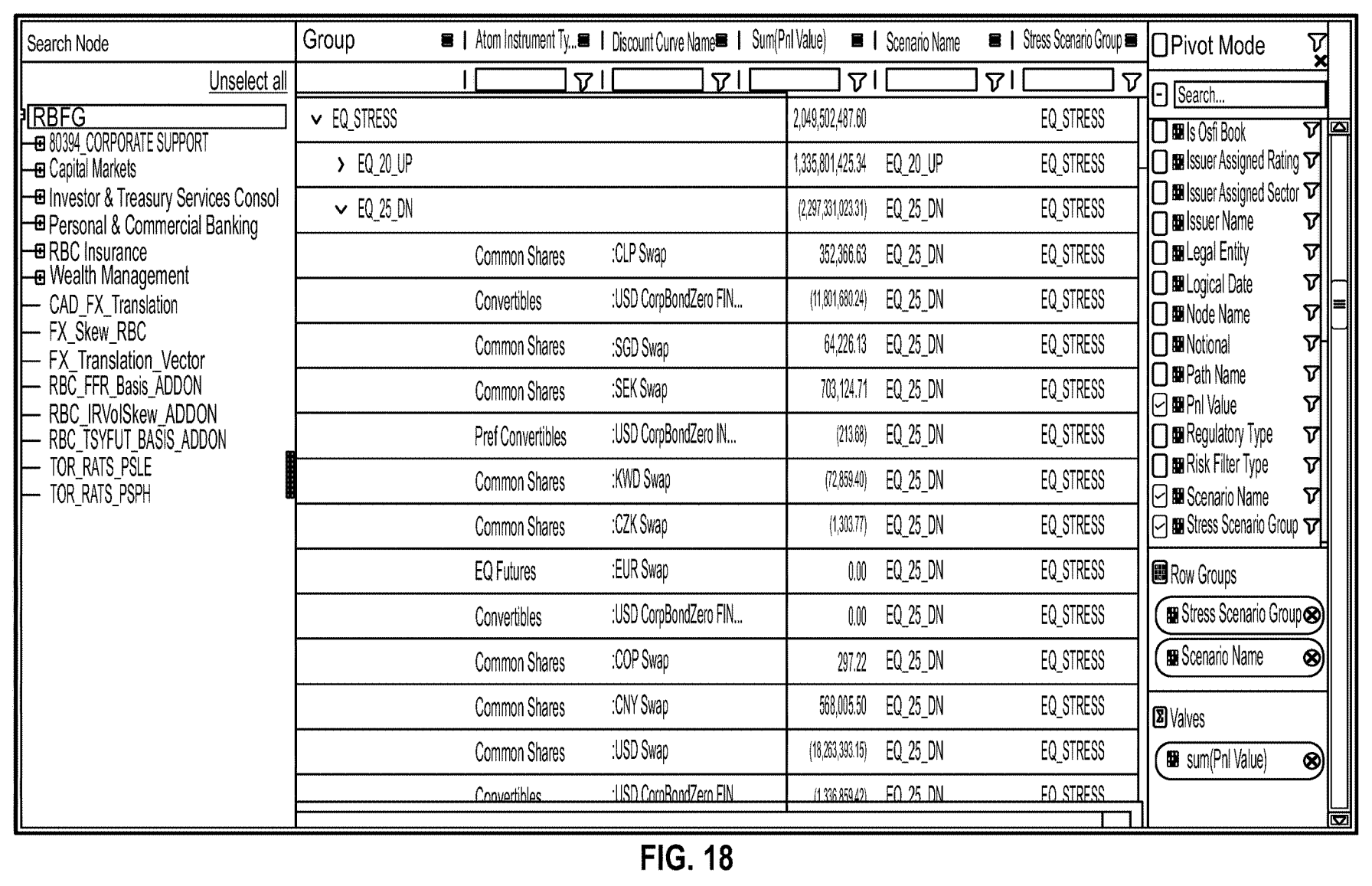

FIG. 18 is an example interface for responsive risk testing. For the same stress scenario, the interface can show the losses and model performance by running the model with additional information like category, type of stress, financial product types as well as the risk factor like USD swap curve or corporate bond curve information. This capability will allow risk managers to review the models results, compare the models (and results) as well as modify the stress loss numbers across multiple attributes and dimensions. The example results can be updated to allow comparison with model results and their performance monitoring and analysis over time.

The interface (e.g. FIG. 18) can allow the risk managers to drilldown into different dimension of the product and model that are driving the stress losses. For example, if the model results indicate that 1 year interest rate risk factor is driving the losses then that risk factor and its corresponding shock will be reviewed. In such cases the risk managers will look at a time series of such stress loss data points (e.g. FIG. 17) that will help them identify trends related to changes in risk factor and their shocks that drive the stress losses. The Kyber system can then allow the risk manager to also run the new or revised risk factor shocks and run them across multiple Kyber Machine learning models like linear regression, neural networks, random forests, and XGBoost and compare the results by updating the interface with model performance data.

Figure 19:
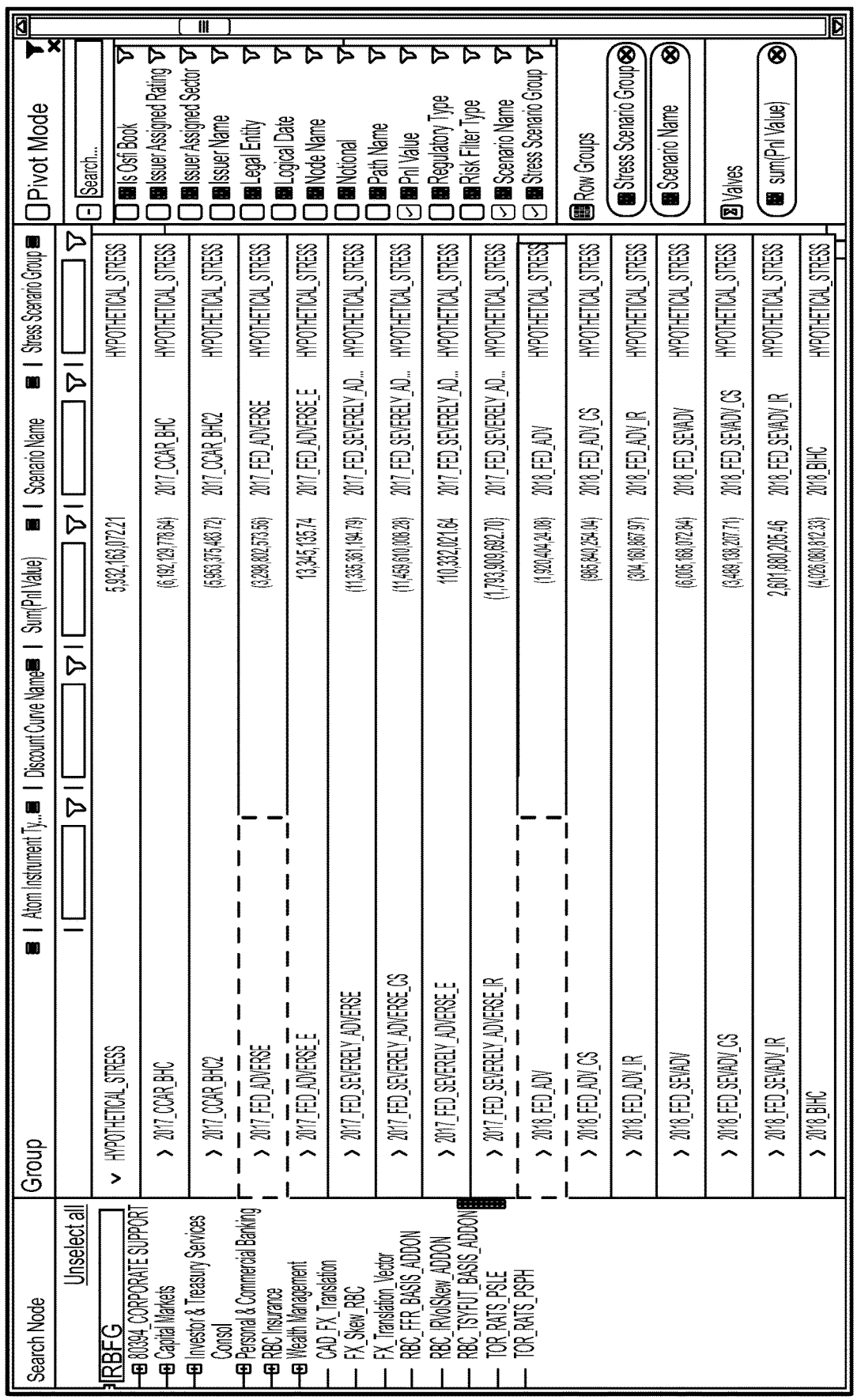
FIG. 19 is an example interface of the system for responsive risk testing.

FIG. 19 is an example interface for responsive risk testing. For the below highlighted Federal reserve scenario, the code definition of the stress scenario can modify or change at different time periods (e.g. every year). For these scenarios, the system can use its models (e.g. KYBER) as a challenger model and compare the stress results. This challenger process can help identify differences over the time period (year over year) in portfolio drivers of risk, risk factors, and changes in shocks.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for improved computer interfaces with interactive visualizations of machine learning models for responsive stress testing, the system comprising:
   a memory storing a plurality of back-end machine learning models that produce enterprise market risk metrics by receiving features extracted from data defining risk factors and market shocks;
   a processor executing instructions stored in the memory to provide for display of a front-end interface to visually interact with the machine learning models to continuously update the front-end interface with interactive visual elements, wherein the processor accesses models of the back-end machine learning models stored in the memory, extracts the features from the data defining the risk factors and market shocks using a feature engineering process, configures the back-end machine learning models with the features extracted from the data defining the risk factors and market shocks and continuously updates the front-end interface with the interactive visual elements comprising:

graphical elements corresponding to risk factors and market shocks;

a first set of selectable indicia to adjust values for the risk factors and market shocks to provide selected values for the risk factors and market shocks as input to the processor for the data defining the risk factors and market shocks;

graphical elements corresponding to models of the back-end machine learning models;

a second set of selectable indicia to select the models and adjust scenario data to provided selected scenario data to the processor to generate scenarios;

graphical elements corresponding to model performance visualizations to visually compare the models with the adjusted values for the risk factors and market shocks over a period of time, wherein the processor generates the model performance data by receiving the adjusted values for the risk factors and market shocks, the models and the adjusted scenario data received from the interface over the period of time, wherein the model performance visualizations indicate visually how the risk factors and market shocks impact portfolio objects and PnL values for the portfolio objects;

graphical elements corresponding to selected scenario output generated by the processor using the adjusted scenario data received from the interface to indicate scenario losses over the period of time; and wherein the processor generates output data as a vector of the model performance data and transmits the output data to the front-end interface to continuously update the front-end interface with the interactive visual elements;

wherein the processor uses one or more stress scenarios to test out different machine learning models to assess model performance by generating updated model performance data;

wherein the interface detects hovering over a visual element for a scenario with an input device and in response updates to indicate predicted loss calculations for the scenario.

2. The system of claim 1 wherein the front-end interface with the graphical elements visually identify a set of risk factors corresponding to stress losses.

3. The system of claim 1 wherein the front-end interface with the graphical elements visually identify model performance by depicting accuracy of predicted stress losses.

4. The system of claim 1 wherein the models comprise official end of day valuation models to measure results of model performance and update models by further calibration.

5. The system of claim 1 wherein the back-end machine learning models comprise challenger models.

6. The system of claim 1 wherein the front-end interface with the graphical elements visually identify risk factors or market variables for incremental improvement in the model performance.

7. The system of claim 1 wherein the one or more processors receive metrics generated by production risk engines and market conditions as scenario input risk, and generate a PnL value based on the scenario input risk, wherein the front-end interface has a graphical element that corresponds to the computed PnL value.

8. The system of claim 1 wherein the interface can receive a command to load a particular model and input data to specify ranges of market variables as shock, and display graphical elements to visually depict how the market variables impact a portfolio.

9. The system of claim 1 wherein visual elements of the interface have parallel coordinates where different axis representing different risk factors and different colours represent different PnL values.

10. The system of claim 1 wherein the interface receives a selected model and ranges for each of a plurality of market shocks, and provides instructions to the processor to load the selected model and ranges for each of a plurality of market shocks for generating the model performance data.

11. The system of claim 1 wherein the interface has a button to trigger generation of different scenario data structures and output data of values for selected scenarios.

12. The system of claim 1 wherein the interface receives a selection of a different set of models than the models and updates the graphical elements to correspond to the different set of models and updated model performance data for the different set of models, wherein the processor receives the selection of the different set of models to generate the updated model performance data to regenerate the graphical elements of the interface.

13. The system of claim 1 wherein the interface receives a selected model and updates the graphical elements to show a number of risk factors and calculated PnL values for the selected model.

14. The system of claim 1 wherein the interface comprises different charts that show predicted and actual values for different scenarios side by side.

15. A computer-implemented process for improved computer interfaces with interactive visualizations of machine learning models for responsive stress testing, the process comprising:

storing a plurality of back-end machine learning models at a memory;

generating enterprise market risk metrics using a processor that accesses models of the back-end machine learning models stored in memory and extracts features from data defining risk factors and market shocks using a feature engineering process;

providing for display a front-end interface including graphical elements to visually interact with the machine learning models to continuously update the front-end interface with interactive visual elements;

receiving model input data from a front-end interface;

updating the front-end interface with the graphical elements using the model input data;

receiving model selections, adjusted scenario data, and adjusted values for the risk factors and market shocks from selectable indicia at the front-end interface over a period of time;

generating model performance visualizations to visually compare the models with the adjusted values for the risk factors and market shocks over a period of time, wherein the processor generates the model performance data by receiving the adjusted values for the risk factors and market shocks, the models and the adjusted scenario data from the interface over time periods, wherein the model performance data defines how the risk factors and market shocks impact portfolio objects and PnL values for the portfolio objects;

updating the front-end interface using the processor to display model performance data to visually indicate how the risk factors and market shocks impact portfolio objects and PnL values for the portfolio objects;

using, by the processor, one or more stress scenarios to test out different machine learning models to assess model performance by generating updated model performance data; and detecting, at the interface, hovering over a visual element for a scenario with an input device and in response updates to indicate predicted loss calculations for the scenario.

16. The process of claim 15 further comprising: receiving metrics generated by production risk engines and market conditions as scenario input data, and generating PnL values based on the scenario input risk, wherein the front-end interface has graphical elements that correspond to the computed PnL values.

17. The process of claim 15 further comprising: receiving a command to load a particular model and input data to specify ranges of market variables as shock, and display graphical elements at the interface to visually depict how the market variables impact a portfolio.

18. The process of claim 15 further comprising receiving a selection of a different set of models than the models, wherein the processor accesses the different set of models to update the graphical elements to correspond to the different set of models and generates the updated model performance data to regenerate the graphical elements of the interface.

* * * * *